(12) United States Patent
Takahashi et al.

(10) Patent No.: US 10,066,665 B2
(45) Date of Patent: Sep. 4, 2018

(54) WHEEL BEARING WITH SENSOR

(75) Inventors: Toru Takahashi, Iwata (JP); Ayumi Akiyama, Iwata (JP); Takayuki Norimatsu, Iwata (JP); Kentarou Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 1401 days.

(21) Appl. No.: 13/883,718

(22) PCT Filed: Nov. 9, 2011

(86) PCT No.: PCT/JP2011/075805
§ 371 (c)(1),
(2), (4) Date: May 6, 2013

(87) PCT Pub. No.: WO2012/066995
PCT Pub. Date: May 24, 2012

(65) Prior Publication Data
US 2013/0223778 A1 Aug. 29, 2013

(30) Foreign Application Priority Data

Nov. 15, 2010 (JP) ................................ 2010-254416
Jul. 25, 2011 (JP) ................................ 2011-161754

(51) Int. Cl.
*F16C 19/52* (2006.01)
*G01M 13/04* (2006.01)
(Continued)

(52) U.S. Cl.
CPC .......... *F16C 19/522* (2013.01); *F16C 19/18* (2013.01); *F16C 19/186* (2013.01);
(Continued)

(58) Field of Classification Search
CPC ....... B60B 27/0005; G01L 5/00; G01G 19/00; F16C 19/522
(Continued)

(56) References Cited

U.S. PATENT DOCUMENTS 6,471,407 B1 10/2002 Katano
6,619,849 B2 9/2003 Katano
(Continued)

FOREIGN PATENT DOCUMENTS

JP 11-94661 4/1999
JP 2001-21577 1/2001
(Continued)

OTHER PUBLICATIONS

PCT International Preliminary Report on Patentability dated May 30, 2013 in corresponding International Application No. PCT/JP2011/075805.
(Continued)

*Primary Examiner* — Kaleria Knox

(57) ABSTRACT

Provided is a sensor-equipped wheel support bearing assembly for rotatably supporting a wheel, including a sensor unit associated with one of outer and inner members that serve as a stationary member. The sensor unit includes a strain generator member that has at least three fixation contact segments fixedly in contact with the stationary member and at least two strain sensors mounted on the strain generator member. A first load estimator is provided to estimate load acting on the bearing assembly, using an average value of output signals of the sensors. A second load estimator is provided to estimate load acting on the bearing assembly, using the average value and an amplitude value of output signals of the sensors. An estimated load provider is provided to sum these outputs from the load estimators in a ratio that depends on wheel rotation speed, for outputting an estimated load.

21 Claims, 16 Drawing Sheets

(51) Int. Cl.
*F16C 19/18* (2006.01)
*G01L 5/00* (2006.01)

(52) U.S. Cl.
CPC ........... *G01L 5/0019* (2013.01); *G01M 13/04* (2013.01); *F16C 2233/00* (2013.01); *F16C 2240/12* (2013.01); *F16C 2326/02* (2013.01)

(58) Field of Classification Search
USPC .......................................... 384/448; 702/173
See application file for complete search history.

(56) References Cited

U.S. PATENT DOCUMENTS

| | | | |
|---|---|---|---|
| 7,043,999 | B2 | 5/2006 | Bernhard et al. |
| 8,540,431 | B2 | 9/2013 | Nishikawa et al. |
| 2002/0196989 | A1 | 12/2002 | Katano |
| 2004/0244496 | A1 | 12/2004 | Bernhard et al. |
| 2010/0129016 | A1* | 5/2010 | Isobe .................. B60B 27/0005 384/448 |
| 2010/0129017 | A1* | 5/2010 | Isobe .................. B60B 27/0005 384/448 |
| 2011/0185823 | A1 | 8/2011 | Nishikawa et al. |
| 2012/0014632 | A1 | 1/2012 | Nishikawa et al. |

FOREIGN PATENT DOCUMENTS

| | | |
|---|---|---|
| JP | 2002-308087 | 10/2002 |
| JP | 2003-530565 | 10/2003 |
| JP | 2004-237881 | 8/2004 |
| JP | 2004-538564 | 12/2004 |
| JP | 2005-22602 | 1/2005 |
| JP | 2007-292233 | 11/2007 |
| JP | 2008-51741 | 3/2008 |
| JP | 2008-175664 | 7/2008 |
| JP | 2010-43901 | 2/2010 |
| JP | 2010-181154 | 8/2010 |
| JP | 2010-230406 | 10/2010 |
| WO | WO 01/77634 A2 | 10/2001 |
| WO | WO/2009/125583 * | 10/2009 .............. G01L 5/00 |
| WO | WO 2010/110173 A1 | 9/2010 |

OTHER PUBLICATIONS

Japanese Office Action dated Jan. 13, 2015 in corresponding Japanese Patent Application No. 2011-161754.
Japanese Office Action dated Mar. 4, 2014 in corresponding Japanese Application No. 2010-254416.
Chinese Office Action dated Apr. 1, 2014 in corresponding Chinese Application No. 201180054760.5.
Extended and Supplementary European Search Report dated Aug. 12, 2014 in corresponding Patent Application No. 11841065.3.
International Search Report dated Feb. 14, 2012 in corresponding International Application No. PCT/JP2011/075805.
Chinese Office Action dated Oct. 14, 2014 in corresponding Chinese Patent Application No. 201180054760.5.

* cited by examiner

Fig. 6
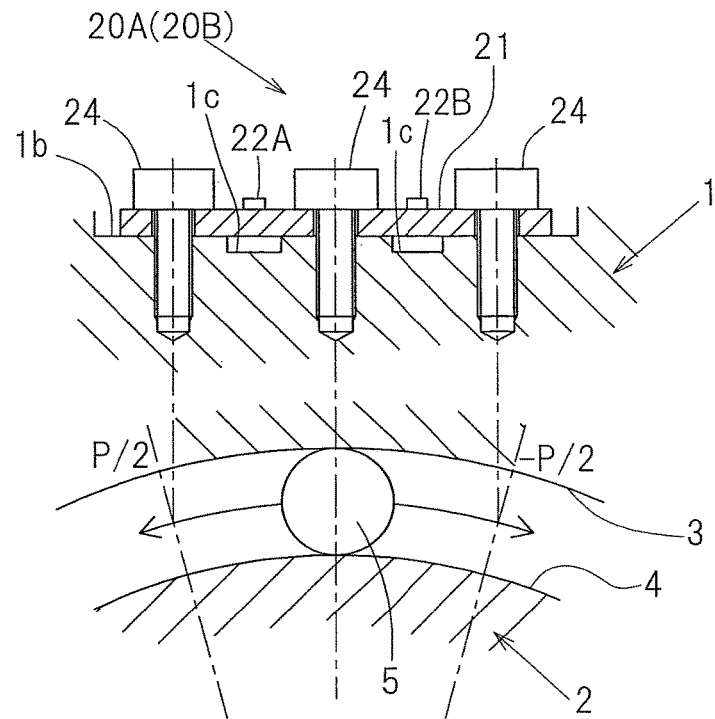
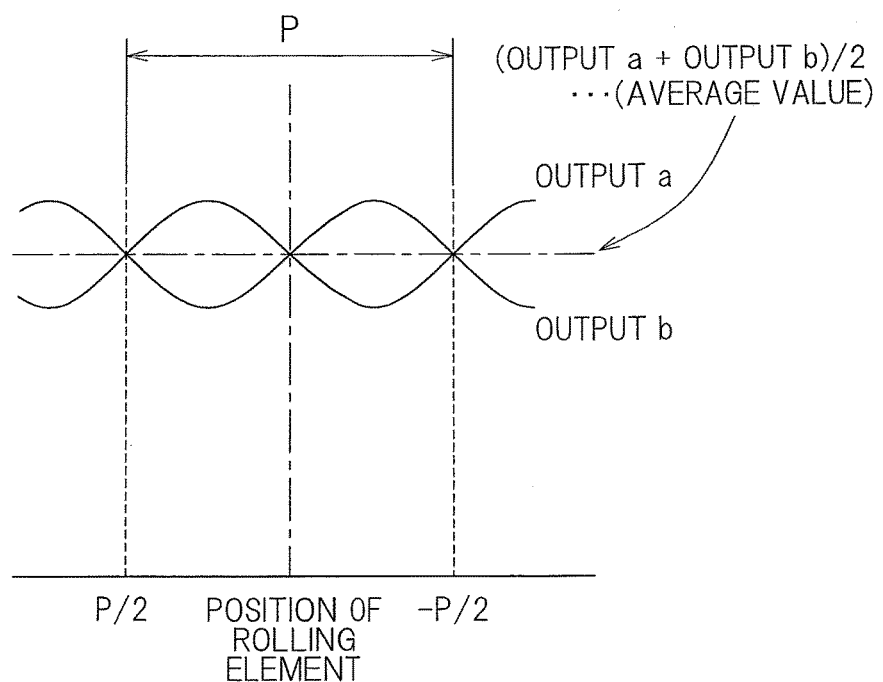

WHEEL BEARING WITH SENSOR

CROSS-REFERENCE TO RELATED APPLICATIONS

This application is a U.S. national stage application of PCT/JP2011/075805 filed Nov. 9, 2011 and claims foreign priority benefit to Japanese patent application No. 2010-254416, filed Nov. 15, 2010, and Japanese patent application No. 2011-161754, filed Jul. 25, 2011, the entire disclosures of which are herein incorporated by reference as a part of this application.

BACKGROUND OF THE INVENTION

Field of the Invention

The present invention relates to a sensor-equipped wheel support bearing assembly in which an incorporated load sensor unit is operable to detect a load acting on a bearing structure that supports a wheel.

Description of Related Art

In order to determine a load acting on a wheel of an automotive vehicle, a wheel support bearing assembly has been proposed, which includes a strain gauge affixed on an outer ring of the bearing assembly to sense strain in an outer diameter surface of the outer ring, so that a load can be determined based on the sensed strain (see, the Patent Document 1 listed below). Such a technique disclosed in the Patent Document 1, however, may not allow for accurate determination of a load acting on a wheel support bearing assembly, because the deformation of a stationary member (i.e. strain in the stationary member) that occurs in response to the load may be inadequate. Hence, the detection sensitivity may be unsatisfactory.

In the attempt to remedy this inadequacy, a sensor-equipped wheel support bearing assembly of the following configuration or construction has been proposed (see, the Patent Document 2 listed below). The Patent Document 2 discloses a sensor-equipped wheel support bearing assembly which includes an outer member having an inner periphery formed with double row rolling surfaces, an inner member having an outer periphery formed with rolling surfaces held in face-to-face relation with the previously described rolling surfaces, and double row rolling elements interposed between the respective rolling surfaces in the outer and inner members and is operable to rotatably support a vehicle wheel relative to a vehicle body structure. One of the outer and inner members, which defines a stationary member, has an outer diametric surface provided with at least one sensor unit pair, each pair being made up of two sensor units arranged at positions that are spaced from each other in a direction circumferentially of the stationary member a distance enough to have a 180° phase difference therebetween. Each sensor unit is made up of a strain generating member, which has at least two contact fixing segments fixed in contact with the outer diametric surface of the stationary member and a sensor fitted to the strain generating member for detecting a strain occurring in the strain generating member.

According to this configuration or construction, a radial load estimating section estimates a radial load acting in a direction radially of the bearing unit from a difference between respective output signals of the two sensor units of the sensor unit pair. And an axial load estimating section estimates an axial load acting in a direction axially of the bearing unit from the sum of those output signals of the two sensor units of the sensor unit pair. The at least one sensor unit pair may include two sensor units that are arranged on upper and lower surface areas of the outer diametric surface of the stationary member, which correspond respectively to top and bottom positions relative to a tire tread surface or a tire periphery in contact with a road surface. An axial load direction determining section may determine a direction of the axial load, from amplitudes of the respective output signals of the sensors of the at least one sensor unit pair. FIG. 20 is a block diagram that schematically shows a load estimation operation according to this configuration or construction.

Such a sensor unit may be arranged so that the contact fixing segments of the strain generating member thereof are in the vicinity of a rolling surface of a stationary member of the wheel support bearing assembly. In this case, rotation of a wheel can induce a sinusoidal-like variation, such as shown in FIG. 21, in output signals of sensors. This variation is caused by the change in sensed strain, which is attributable to the passing-by of rolling elements. In this configuration or construction, the difference in amplitude (i.e. difference in amplitude of a frequency component attributable to revolution of rolling elements) between sensor output signals of two sensor units that may be positioned upwardly and downwardly, respectively, may be used to determine an axial load. The axial load may be calculated using appropriate load estimation parameters, which are selected according to whether the determined direction of the axial load is negative or positive. In this way, a load may be estimated with good sensitivity.

Such a configuration as disclosed in the Patent Document 2, however, requires an amplitude value of sensor output signals to be calculated, to enable selection of optimal load estimation parameters. Hence, such a configuration is disadvantageous when an amplitude value cannot be obtained. Specifically, when a wheel is not rotating or when the wheel rotation speed is very low, change in signals in response to application of a load to rolling elements is either zero or occurs very slowly. In such a case, change in sensor output signals cannot be used to calculate an amplitude value.

Nevertheless, in order to obtain an amplitude value of sensor output signals in response to application of a load to rolling elements, it may be contemplated to arrange a plurality of sensors so as to cover a range (i.e. a circumferential length corresponding to arrangement pitch of the rolling elements) sufficient to monitor the influence of the load applied to the rolling elements. In this way, direct measurement of strain distribution may be obtained. However, this requires an additional number of sensors and results in more complicated circuit structure for detection, thereby leading to higher cost and increased burdens for ensuring reliability.

In view of the foregoing, a load estimating section for a sensor-equipped wheel support bearing assembly, which has a configuration as shown in a block diagram of FIG. 22, has been developed (see the Patent Document 3 listed below).

Such a configuration includes a first load estimating section for calculating and estimating a load, acting on the wheel support bearing assembly, using an average value of output signals of sensors, a second load estimating section for calculating and estimating a load, acting on the wheel support bearing assembly, using the average value and an amplitude value of output signals of the sensors, and an output selector for selectively switching one of the loads estimated by the first and second load estimating sections in dependence on a vehicle wheel rotating speed.

In such a configuration, load estimating calculation may be switched in dependence on a vehicle wheel rotating speed between a load estimating calculation equation that uses as a variable an average value A of output signals of the sensors and a load estimating calculation equation that uses as variables the average value A and an amplitude value B of output signals of the sensors. Hence, in normal travel regime, an equation that uses an average value A of output signals of sensors and an amplitude value B of output signals of the sensors may be utilized in load estimating calculation, while, in low speed regime or when a wheel is not rotating, an equation that uses the average value A of the output signals of the sensors may be utilized in load estimating calculation. Note that, in such a configuration, information related to a vehicle wheel rotating speed may be used to determine the rotating speed.

PRIOR ART DOCUMENT

Patent Document

[Patent Document 1] JP Published Int'l Application No. 2003-530565
[Patent Document 2] JP Laid-open Patent Publication No. 2010-043901
[Patent Document 3] JP Laid-open Patent Publication No. 2010-181154

SUMMARY OF THE INVENTION

A configuration such as disclosed in the Patent Document 2 or the Patent Document 3 is designed to select, among a number of load estimation parameters, optimal parameter(s), based on the status of sensor output signals and/or the characteristics of the estimated load. In this way, non-linear properties of sensor(s) may be corrected. Therefore, detection results with reduced errors may be obtained.

However, calculating an amplitude value of sensor output signals may require the use of sensor output signals that are obtained within a certain period of time or may require a certain number of samplings of sensor output signals. This may cause a time delay due to processing of signals. For example, in a configuration where a root mean square value (i.e. RMS value) of sensor output signals that are obtained within a certain period of time T is calculated to generate the latest amplitude value, the resulting time delay may reach approximately T/2. Especially, in such a configuration as disclosed in the Patent Document 3 that may switch in dependence on a travel speed (i.e. vehicle wheel rotating speed) between a load estimating calculation equation that uses as a variable an average value A of output signals of sensors and a load estimating calculation equation that uses as variables the average value A and an amplitude value B of output signals of the sensors, these two different modes may have different time delays for producing an estimated load. This may also manifest in the form of detection errors.

The two different calculation equations may produce different calculation results. When their calculation results are different, switching between these equations may create a discontinuous change in an estimated load output. Such a discontinuous change in an estimated load output and/or significant detection errors in an estimated load output are disadvantageous for a control system that uses the estimated load value to perform various control operations.

To remedy such drawbacks, it may be contemplated to switch different calculation results produced by two different calculation equations according to information related to a vehicle wheel rotating speed, such that these results would make continuous, smoother shifts. Such a vehicle wheel rotating speed may be measured by an incorporated rotation sensor or may be determined by using information related to the vehicle wheel rotating speed that may be supplied from a vehicle body. However, this configuration may become incompatible when a vehicle wheel rotating speed cannot be measured or information related to a vehicle wheel rotating speed cannot be obtained.

Instead of using information from, for example, a rotation sensor, it may be contemplated to calculate and use a rating value which makes a change that is more or less in conformity with a rotating speed, so that switching between load estimating calculations may be performed based on the rating value. Such a rating value may be obtained even when signals are not available from a rotation sensor or when information related to a rotation speed cannot be constantly and reliably obtained. Although such a rating value may enable determination of whether the rotating speed is situated in low speed regime, it is not proportionate to the rotating speed and therefore does not accurately reflect the rotation speed. Hence, such a rating value may not be utilized in a configuration designed to perform switching in dependence on a rotation speed to achieve continuous, smoother shifts.

A processing circuit may be implemented which includes an A to D converter that digitalizes sensor output signals to obtain a digitalized value for sampling. However, a frequency component contained in the sensor output signals, which is attributable to revolution of bearing rolling elements and which changes in proportion to the travel speed of a vehicle, may reach, in high speed regime, a frequency that is in the vicinity of a sampling rate for AD conversion. Aliasing may appear in the sampled data, and an amplitude value B may not be accurately produced. An LPF (i.e. low-pass filter) may be provided at the input of signals in order to minimize aliasing. However, in high speed regime, the presence of such an LPF may decrease a measured amplitude value B, thus increasing load estimation errors. Those aforementioned discontinuous change, significant detection errors and etc. are disadvantageous for a control system—for example, a control system for an automotive vehicle—that uses the resulting estimated load value to perform various control operations.

An object of the present invention is to provide a sensor-equipped wheel support bearing assembly which can correct non-linear properties of sensor(s) to minimize load estimation errors, can calculate an estimated load value regardless of various characteristics of an applied load without creating a discontinuous change in the estimated load value, and can produce an estimated load value with a minimum detection time delay. Another object of the present invention is to provide a sensor-equipped wheel support bearing assembly which can calculate an estimated load value with accuracy through load estimation calculations that do not use signals from a rotation sensor and/or information related to a vehicle wheel rotating speed that may be supplied from a vehicle structure. The general aspects of the present invention will now be described using the reference signs in the figures showing embodiments of the present invention.

The first aspect of the present invention provides a sensor-equipped wheel support bearing assembly for rotatably supporting a wheel relative to a vehicle body, which includes an outer member 1 having an inner periphery formed with a plurality of rolling surfaces, and an inner member 2 having an outer periphery formed with a plurality of rows of raceways surfaces opposed to the rolling surfaces of the outer member 1. One of the outer member 1 and the inner member 2 serves as a stationary member. A plurality of rows of rolling elements 5 are interposed between the rolling surfaces of the outer member 1 and the rolling surfaces of the inner member 2. Load-detectable sensor unit(s) 20A, 20B may be provided which includes a strain generator member 21 and at least two sensors 22A, 22B mounted on the strain generator member 21 to sense strain in the strain generator member 21. The strain generator member 21 includes at least three fixation contact segments 21a that are fixedly in contact with the stationary member.

A first load estimator 31 is provided which is configured to estimate through calculation a load acting on the bearing assembly, based on an average value A of output signals of the sensors 22A, 22B. A second load estimator 32 is also provided which is configured to estimate through calculation a load acting on the bearing assembly, based on a combination of the average value A and an amplitude value B of output signals of the sensors 22A, 22B. An estimated load provider 33 is also provided which is configured to sum a calculation result from the first load estimator 31 and a calculation result from the second load estimator 32 in a ratio r that depends on a wheel rotation speed, for output of an estimated load value.

In this configuration, a load may act between a tire of a wheel and a road surface. This causes a load to be applied to the stationary member (e.g. outer member 1) of the wheel support bearing assembly, thus, in turn, causing deformation of the stationary member. In this configuration, the at least three fixation contact segments 21a in the sensor unit(s) 20A (20B), which are fixedly in contact with the stationary member, facilitates transmission of strain in the outer member 1 to the strain generator member 21 in amplified form. Such strain can be sensed by the sensors 22A, 22B with enhanced sensitivity. Also, hysteresis in output signals of the sensors 22A, 22B can be minimized.

Furthermore, the provision of the first load estimator 31 which is configured to estimate through calculation a load acting on the bearing assembly, based on an average value A of output signals of the strain sensors 22A, 22B of the sensor unit(s) 20A (20B), the provision of the second load estimator 32 which is configured to estimate through calculation a load acting on the bearing assembly, based on a combination of the average value A and an amplitude value B of output signals of the sensors 22A, 22B, and the provision of the estimated load provider 33 which is configured to sum a calculation result from the first load estimator 31 and a calculation result from the second load estimator 32 in a ratio r that depends on a wheel rotation speed, for output of an estimated load value, can provide such advantages as those listed below:

Detection time delay that may be caused by a load estimation calculation operation can be minimized, thereby leading to facilitated control that makes use of the resulting load information.

In a configuration such as disclosed in the Patent Document 3, switching between different load estimation modes with different time delays may, in turn, cause a sudden change in time delay for generating an estimated load. Such a time delay may manifest in the form of detection errors. In contrast, with a sensor-equipped wheel support bearing assembly according to the present invention, the aforementioned two types of calculation results may be summed in a summation ratio r that shows a continuous change. In this way, the resulting estimated load value does not make a discontinuous change, thereby facilitating the use of the resulting estimated load value for various control operations of a vehicle.

When a wheel is not rotating or a wheel rotation speed is situated in low speed regime, a first load value LA can be produced which is based on the average value A. This enables determination of the characteristics of a load acting between a tire and a road surface even when the vehicle is not moving.

The aforementioned two types of calculation results may be summed in a summation ratio r. Appropriate control of the summation ratio r can optimize an estimated load value as desired.

In high speed regime, sensor output signals may reach a frequency that is in the vicinity of a sampling rate used for AD conversion. Summing the aforementioned two types of calculation results in a summation ratio r enables load detection with enhanced accuracy in spite of possible errors in the amplitude value B that may be caused during high speed regime, by taking a higher proportion of the first load value LA that is calculated based on the average value A, thus minimizing the undesirable effect of the possible errors that are in the amplitude value B.

As can be seen from the above discussion, non-linear properties of sensor(s) can be corrected so as to minimize load estimation errors. Also, an estimated load value can be calculated regardless of various characteristics of an applied load without creating a discontinuous change in the estimated load value. Moreover, an estimated load value can be produced with a minimum detection time delay. Also, possible discontinuities in an estimated load value can be minimized, and the resulting estimated load value may be more compatible with a control system that performs various controls based on the estimated load value.

In the present invention, the fixation contact segments 21a in the sensor unit(s) 20A (20B) may include first, second and third fixation contact segments 21a, with the first and second fixation contact segments 21a being next to each other with a space therebetween and with the second and third fixation contact segments 21a being next to each other with a space therebetween, while the sensors 22A, 22B include two sensors 22A, 22B, with one 22A being arranged between the first and the second fixation contact segments 21a and with the other 22B being arranged between the second and the third fixation contact segments 21a, with a space between the two sensors 22A, 22B, in which the space between the fixation contact segments 21a or the space between the two sensors 22A, 22B has a circumferential dimension that is ($\frac{1}{2}$+n) times as much as arrangement pitch of the rolling elements and in which the first and the second load estimators 31, 32 use as the average value A a sum of output signals of the two sensors 22A, 22B, where n is an integer.

In this configuration, output signals of the two sensors 22A, 22B are approximately 180° out of phase from each other, thus canceling off any variable components in the average value A that may be caused by the passing-by of the rolling elements and also adequately canceling possible effects related to temperature as well as possible effects due to slips—for example, slips between a knuckle surface and a flange surface—on the amplitude value B. In other words, the average value A of output signals of the two sensors 22A, 22B is a value that has cancelled off any variable components that may be caused by the passing-by of the rolling elements, while the amplitude value B is a more accurate value that has significantly removed possible effects related to temperature as well as possible effects due to slips—for example, slips between a knuckle surface and a flange surface—on the amplitude value B.

In the present invention, the summation ratio r used in the estimated load provider 33 is preferably set to 1 when a wheel is not rotating or when the wheel rotation speed is situated in low speed regime.

In one embodiment of the present invention, the summation ratio r used in the estimated load provider 33 may be set so as to increase as the wheel rotation speed shifts from normal speed regime to high speed regime.

The summation ratio r used in the estimated load provider 33 may be relative to values of the wheel rotation speed and may be set to be parametrically variable from outside. The term "mapped" used herein refers to a configuration where the summation ratio r is defined so as to correspond to various values of a wheel rotation speed. The term "from outside" used in this context refers to "from one or more elements and/or components except the estimated load provider 33, a unit containing the aforementioned mapped information, and processing stages that precede the estimated load provider 33."

In the present invention, the estimated load provider 33 may be configured to receive direct input of an output signal of a wheel rotation speed sensor mounted on the bearing assembly to determine the wheel rotation speed.

In the present invention, the estimated load provider 33 may be configured to receive information related to the wheel rotation speed from an ECU (i.e. electronic control unit) in the vehicle body.

In the present invention, the estimated load provider 33 may be configured to determine the wheel rotation speed, based on frequency of an amplitude component contained in output signals of the sensors 22A, 22B, which is attributable to revolution of the rolling elements 5.

In the present invention, the sensor unit 20A (20B) may include at least three sensor units 20A (20B), with the first load estimator 31 and the second load estimator 32 being configured to estimate through calculation radial load components $F_x$, $F_z$ radially acting on the bearing assembly as well as an axial load component $F_y$ axially acting on the bearing assembly, based on output signals of sensors 22A, 22B of the at least three sensor units 20A (20B).

In the present invention, the sensor unit 20A (20B) may includes four sensor units 20A (20B), and the four sensor units 20A (20B) may be evenly disposed on upper, lower, right and left parts, respectively, of an outer diameter surface of the stationary member such that the four sensor units 20A (20B) are positioned to be circumferentially 90° out of phase from each other, with the upper and lower parts corresponding to vertical regions relative to a tire tread and with the right and left parts corresponding to horizontal regions relative to a tire tread. Such arrangement of the four sensor units enables more accurate estimation of a vertical load component $F_z$ acting on the bearing assembly, a load component $F_x$ that may serve as a drive force or a brake force, and/or an axial load component $F_y$.

In the present invention, the sensor unit 20A (20B) may include a temperature sensor 19, and a temperature compensator 37 may be provided which is configured to correct output signals of the sensors, based on detection signals from the temperature sensor 19. Even with the same load, heat generated by rotation of the bearing assembly and/or an ambient environment could change the temperature of the bearing assembly. This may cause, for example, thermal expansion that can result in variations in the output signals of the sensors of the sensor unit 20A (20B). In this way, the detected load may be undesirably affected by temperature. A temperature compensator 37 that may be configured to correct the average value A of output signals of the sensors according to the temperature of the bearing assembly and/or an ambient temperature can minimize possible load estimation errors caused by the temperature.

In the present invention, in addition to the estimated load provider 33, a second estimated load provider 35 may be provided which is configured to individually output a first estimated load value LA estimated through calculation by the first load estimator 31 and a second estimated load value LB estimated through calculation by the second load estimator 32. Such a configuration of providing, in addition to the estimated load provider 33, a second estimated load provider 35 which is configured to individually output the first and second estimated load values LA, LB estimated through calculation by the first load estimator 31 and the second load estimator 32, respectively, allows an ECU that may be provided in the vehicle body to sum these calculation results according to various travel conditions of the vehicle. This enables determination to be made based on more information on travel conditions of the vehicle, thus facilitating the control of the summation ratio r and obtaining an optimal estimated load value.

In the present invention, a rotation speed rating unit 36 may be provided which is configured to determine a rating value V that represents the wheel rotation speed, based on output signals of the sensors 22A, 22B, with the estimated load provider 33A being configured to sum the calculation results with a ratio r that changes depending on time elapsed since a traverse of the rating value V across a predefined threshold value Vth.

The provision of an estimation unit 30 that includes the first load estimator 31 configured to estimate through calculation a load acting on the bearing assembly, based on an average value A of output signals of the sensors 22A, 22B of the sensor unit 20A (20B) and that also includes the second load estimator 32 configured to estimate through calculation a load acting on the bearing assembly, based on a combination of the average value A and an amplitude value B of output signals of the sensors 22A, 22B, the provision of the rotation speed rating unit 36 configured to determine a rating value V that represents the wheel rotation speed, based on output signals of the sensors 22A, 22B, and the provision of the estimated load provider 33A configured to sum based on the rating value V the calculation results of the estimators 31, 32 in the estimation unit 30, for output of an estimated load value, in which the estimated load provider 33A is configured to sum the calculation results in a ratio r that depends on time elapsed since a traverse of the rating value V across a predefined threshold value Vth, can provide such advantages as those listed below:

Load estimation calculation can be performed without using signals from a rotation sensor and/or using information related to a vehicle wheel rotating speed that may be supplied from a vehicle body, thereby eliminating the need to provide additional wires. This can minimize manufacturing cost of a load sensor assembly and can also provide enhanced freedom in mounting a load sensor assembly in a vehicle.

Switching between a load estimation calculation in normal speed rotation regime and a load estimation calculation in low speed rotation regime can minimize load estimation errors, thus providing an estimated load value with enhanced accuracy.

A summation ratio configured to change with no discontinuous shift can prevent discontinuous change in load signals from occurring when switching load estimation calculations in dependence on rotation speed, thus facilitating the use of load signals for various control operations of a vehicle.

A sudden braking operation during travel may cause a sudden change in a rotation speed, which may, in turn, cause a slip. The aforementioned configuration, however, produces an estimated load value even when a wheel is not rotating or the rotation speed is situated in very low speed regime. Thus, regardless of travel conditions of the vehicle, signals can be used in, for example, various control operations of a vehicle.

In the present invention, the average value A and/or the amplitude value B of output signals of the sensors 22A, 22B used in calculations in the estimation unit 30 may be determined based on output signals of the sensors 22A, 22B that are obtained within a defined period of time T. In this configuration, the defined period of time T may change according to the rating value V determined by the rotation speed rating unit 36. The defined period of time T may be configured to be longer when the wheel rotation speed is situated in low speed regime and to be shorter when the rotation speed is higher. This can minimize the reduction in accuracy of calculation by the estimation unit 30 that involves the use of the amplitude value B during low speed regime, while expediting the response of calculation results during higher speed regime where a quicker response is desired.

In the present invention, the summation ratio r used in the estimated load provider 33A may be determined by a linear function that uses as a variable the time elapsed since a traverse of the rating value V across the predefined threshold value Vth.

In the present invention, the summation ratio r used in the estimated load provider 33A may be determined by a quadratic or higher order function that uses as a variable the time elapsed since a traverse of the rating value V across the predefined threshold value Vth.

In the present invention, change in the summation ratio r used in the estimated load provider 33A may stop when the time elapsed since a traverse of the rating value V across the predefined threshold value Vth reaches a predefined transition period of time a.

In this configuration, if time elapsed since the rating value V once traversed the predefined threshold value Vth until subsequently traverse the predefined threshold value Vth is shorter than the transition period of time a, the summation ratio r at the time of the re-traverse of the rating value V across the predefined threshold value Vth may become a starting value from which a subsequent change in the summation ratio r occurs.

In the present invention, the rotation speed rating unit 36 may be configured to generate, as the rating value V as sum of selected amplitude values B of output signals of the sensors 22A, 22B.

In the present invention, the rotation speed rating unit 36 may be configured to determine the rating value V, based on frequency of an amplitude component contained in output signals of the sensors 22A, 22B, which is attributable to revolution of the rolling elements.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

FIG. 6 shows how the positions of rolling elements may affect output signals from a sensor unit;

DESCRIPTION OF THE EMBODIMENTS

The first embodiment of the present invention will now be described with reference to FIGS. 1 to 13. In the following discussion, the first embodiment is applied to a wheel support bearing assembly of a third generation type, for rotatably supporting a drive wheel, in which an inner member serves as a rotating member. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
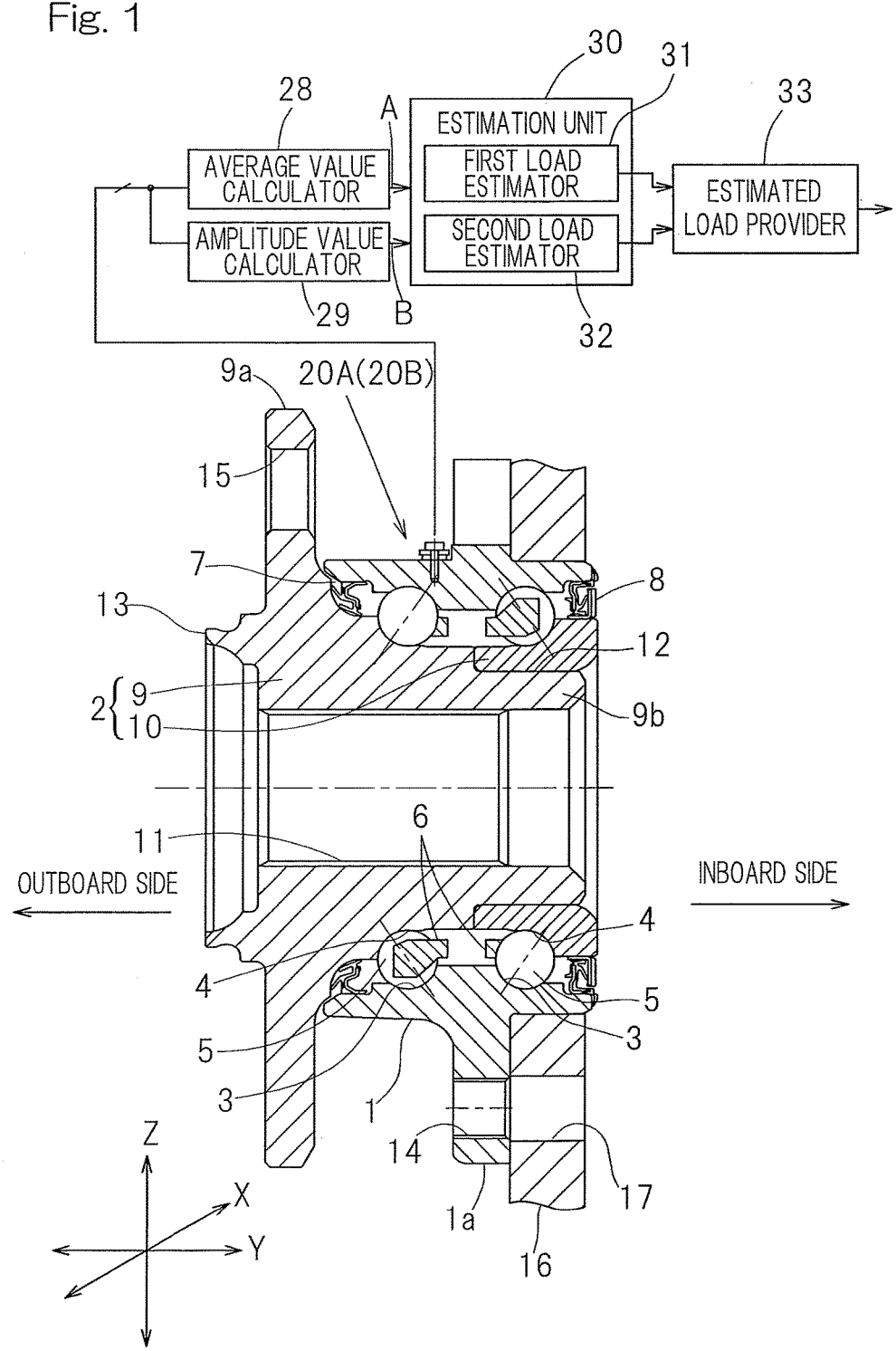
FIG. 1 shows a longitudinal cross sectional view of a sensor-equipped wheel support bearing assembly according to the first embodiment of the present invention, together with a block diagram of a schematic configuration of a detection system.

As shown in the longitudinal cross sectional view of FIG. 1, a sensor-equipped wheel support bearing assembly of the first embodiment provides a bearing structure that includes an outer member 1 having an inner periphery formed with a plurality of rolling surfaces 3, an inner member 2 having an outer periphery formed with raceways surfaces 4 opposed to the rolling surfaces 3, and a plurality of rows of rolling elements 5 interposed between the rolling surfaces 3 of the outer member 1 and the rolling surfaces 4 of the inner member 2. The illustrated wheel support bearing assembly is configured as a double-row angular contact ball bearing assembly, in which the rolling elements 5 are in the form of rows of balls, with each row of balls being retained by a retainer 6. The rolling surfaces 3, 4 have arcuate cross sections and have respective contact angles held in back-to-back relation with each other. A pair of sealing units 7, 8 seal respective opposite ends of a bearing space delimited between the outer member 1 and the inner member 2

The outer member 1 serves as a stationary member. The outer member 1 is of one-piece construction having an outer periphery that forms a vehicle body mounting flange 1a, which is fitted to a knuckle 16 of a suspension system (not shown) associated with a vehicle body. The flange 1a has a plurality of circumferential portions formed with respective screw holes 14 for attachment to the knuckle. The vehicle body mounting flange 1a is fitted to the knuckle 16 by inserting knuckle bolts (not shown) from an inboard side into bolt insertion holes 17 in the knuckle 16 and subsequently screwing the knuckle bolts in the screw holes 14.

The inner member 2 serves as a rotating member. The inner member 2 includes a hub unit 9 and an inner ring 10. The hub unit 9 has a wheel mounting hub flange 9a and also has an axle portion 9b. The inner ring 10 is mounted on an outer periphery of an inboard end of the axle portion 9b. The hub unit 9 and the inner ring 10 are formed with the respective rows of the aforementioned rolling surfaces 4. The hub unit 9 has an inboard end, an outer periphery of which is stepped to form a reduced diameter surface that defines an inner ring mounting surface 12, to which the inner ring 10 is fitted. The hub unit 9 has a center formed therein with a through bore 11. The hub flange 9a has a plurality of circumferential portions formed with respective holes 15 for force-fitting hub bolts (not shown). The hub unit 9 also has a cylindrical pilot portion 13 in the vicinity of a root of the hub flange 9a for guiding a wheel (not shown) and brake components (not shown). The pilot portion 13 protrudes towards an outboard side from a portion of the hub unit 9.

Figure 2:
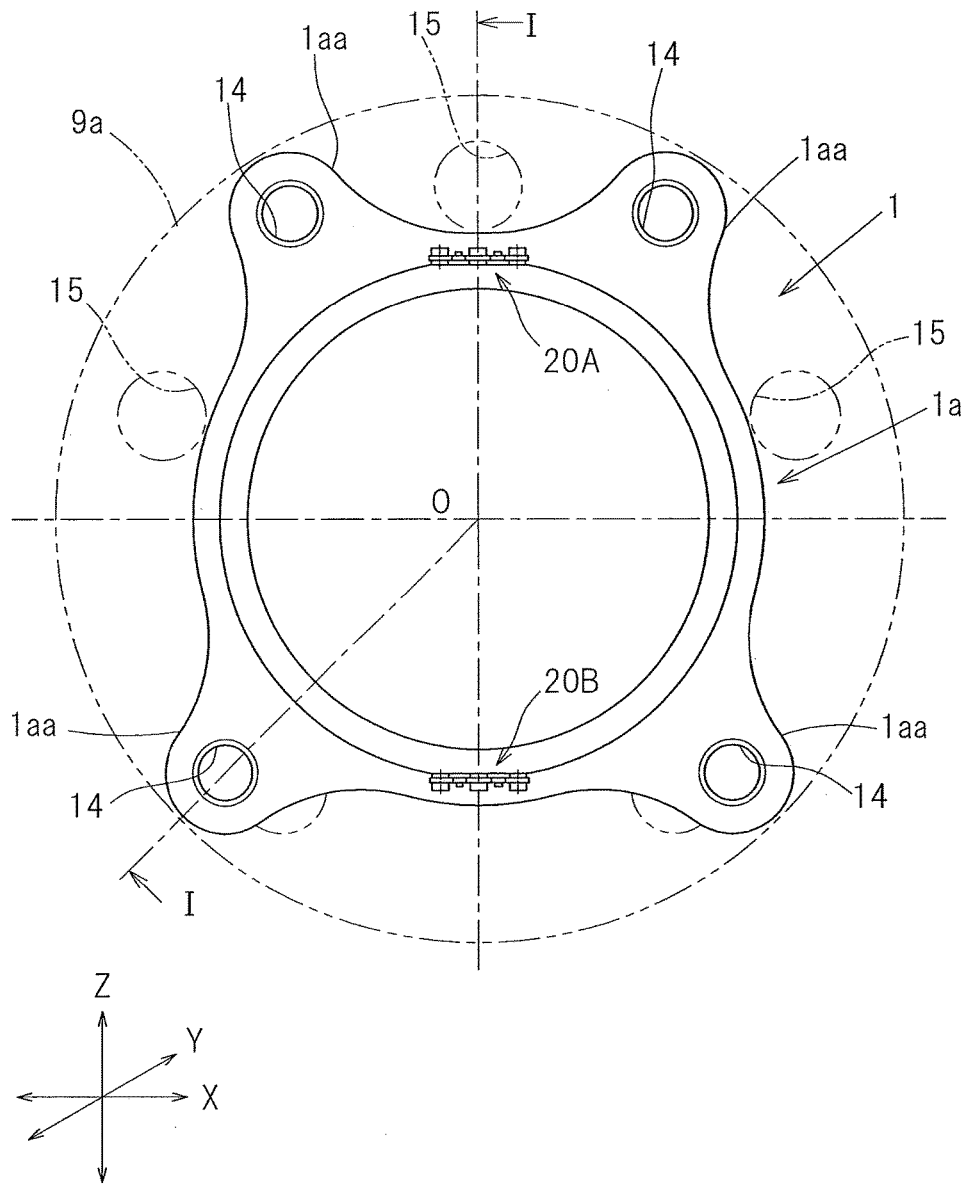
FIG. 2 shows a front elevational view of an outer member of the sensor-equipped wheel support bearing assembly, as viewed from an outboard side.

FIG. 2 shows a front elevational view of the outer member 1 of the wheel support bearing assembly of the embodiment under discussion, as viewed from an outboard side. It is to be noted that the cross section of the wheel support bearing assembly of FIG. 1 is taken along the line I-I in FIG. 2. As shown in FIG. 2, the circumferential portions of the vehicle body mounting flange 1a in which the respective screw holes 14 are formed are in the form of protrusions 1aa that protrudes radially outwards with respect to other portions of the vehicle body mounting flange 1a.

Two sensor units 20A, 20B are associated with an outer diameter surface of the stationary member—that is, the outer member 1. In the illustrated example, the sensor units 20A, 20B are disposed on upper and lower parts, respectively, of an outer diameter surface of the outer member 1, with the upper and lower parts corresponding to vertical regions relative to a tire tread.

Figure 3:
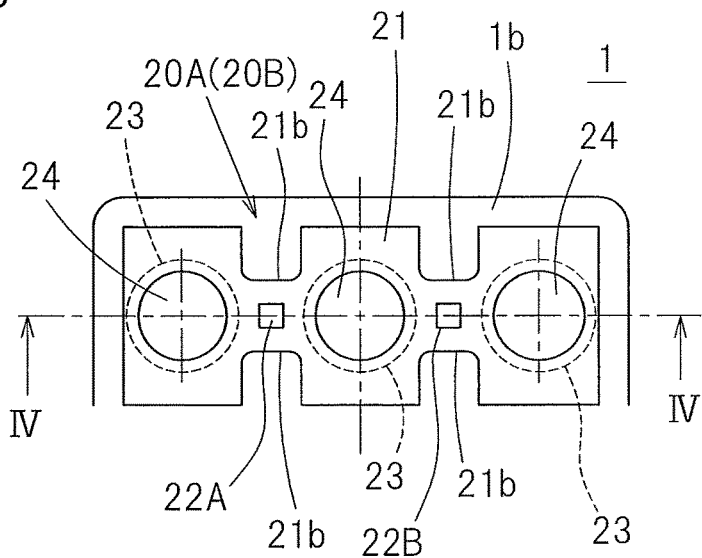
FIG. 3 shows a top view of a sensor unit of the sensor-equipped wheel support bearing assembly on an enlarged scale.
Figure 4:
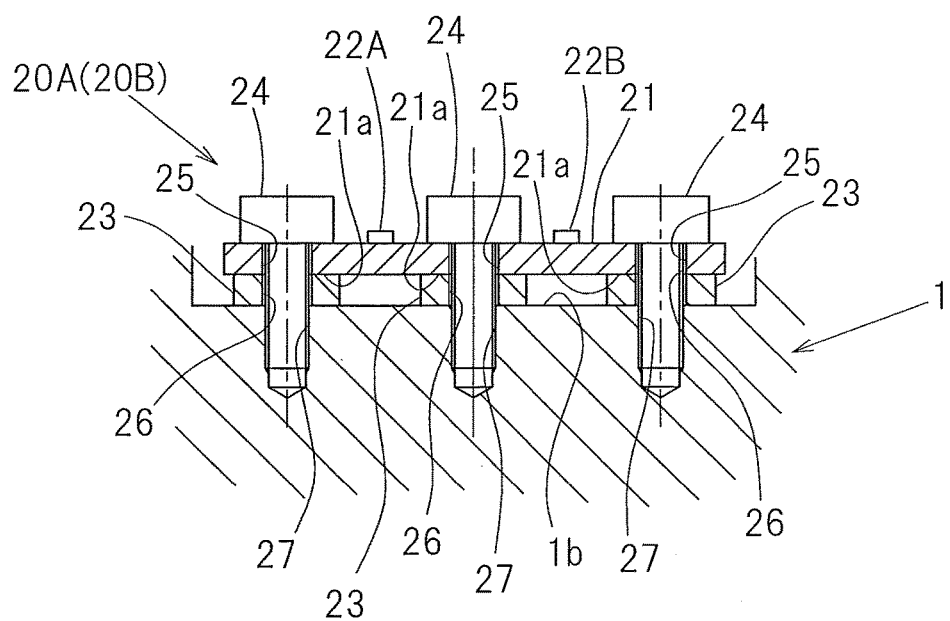
FIG. 4 shows a cross section of FIG. 3 cut along the line IV-IV.

As shown in an enlarged top view of FIG. 3 and an enlarged cross sectional view of FIG. 4, each of the sensor units 20A, 20B includes a strain generator member 21 and at least two—in the illustrated example, two—strain sensors 22A, 22B mounted on the strain generator member 21 to sense strain in the strain generator member 21. The strain generator member 21 includes a thin metal plate, such as a steel plate, that has a thickness of 2 mm or smaller and that is elastically deformable, with the metal plate having a general shape of a strip having a uniform width along its length and with the metal plate having opposite sides each formed with cutout portion 21b. The cutout portions 21b have corners having arcuate cross sections.

The strain generator member 21 includes at least three—in the illustrated example, three—fixation contact segments 21a that are fixedly in contact through spacers 23 with an outer diameter surface of the outer member 1. The illustrated three fixation contact segments 21a are aligned in a row along a longitudinal direction of the strain generator member 21. The illustrated two strain sensors 22A, 22B are affixed on the strain generator member 21 at locations where larger strain occurs in response to load components of various directions. In particular, the illustrated two sensors 22A, 22B are placed on an outer face of the strain generator member 21 such that they are arranged between neighboring fixation contact segments 21a. Specifically, as shown in FIG. 4, one strain sensor 22A is arranged between a left end fixation contact segment 21a and a central fixation contact segment 21a while another strain sensor 22B is arranged between the central fixation contact segment 21a and a right end fixation contact segment 21a.

As shown in FIG. 3, the cutout portions 21b are formed in the opposite sides of the strain generator member 21 at locations corresponding to the illustrated two strain sensors 22A, 22B. In this way, the strain sensors 22A, 22B can sense strain in the strain generator member 21 along a longitudinal direction of the strain generator member 21 in the vicinity of the cutout portions 21b. Preferably, the strain generator member 21 does not plastically deform even when a maximum possible external force is applied to the stationary member—that is, the outer member 1—and/or when a maximum possible force acts between a tire and a road surface. This is because a strain generator member 21, if plastically deformed, might be unable to transmit the deformation of the outer member 1 to the sensor units 20A, 20B, thus undesirably affecting the strain measurement.

The sensor units 20A, 20B are disposed with respect to the outer member 1 such that the illustrated three fixation contact segments 21*a* of the strain generator member 21 are circumferentially spaced from each other and are positioned on respective axial locations extending on a common plane, with the fixation contact segments 21*a* being fixed through respective spacers 23 to an outer diameter surface of the outer member 1 by means of bolts 24. The bolts 24 are inserted into bolt insertion radial through holes 25 formed in the respective fixation contact segments 21*a*, are passed through bolt insertion holes 26 formed in the spacers 23 and are screwed into screw holes 27 formed in an outer periphery of the outer member 1.

With such a configuration in which the fixation contact segments 21*a* are fixed through spacers 23 to an outer diameter surface of the outer member 1, the portions of the metal plate of the strain generator member 23 where the cutout portions 23 are formed can be separated a distance from an outer diameter surface of the outer member 1, thus facilitating straining deformation of the portions of the strain generator member 21 that are in the vicinity of the cutout portions 23. In the embodiment under discussion, the fixation contact segments 21*a* are positioned on respective axial locations that are in the vicinity of an outboard-row rolling surface 3 of the outer member 1. The vicinity of an outboard-row rolling surface 3 of the outer member 1 used herein refers to a range extending from the center between an inboard-row raceways surface 3 and the outboard-row rolling surface 3 to the area where the outboard-row rolling surface 3 is formed. The outer diameter surface of the outer member 1 includes a flat segment 1*b* with which the spacers 23 are fixedly in contact. This enables the sensor units 20A, 20B to be fixed to an outer diameter of the outer member 1 with increased stability.

Figure 5:
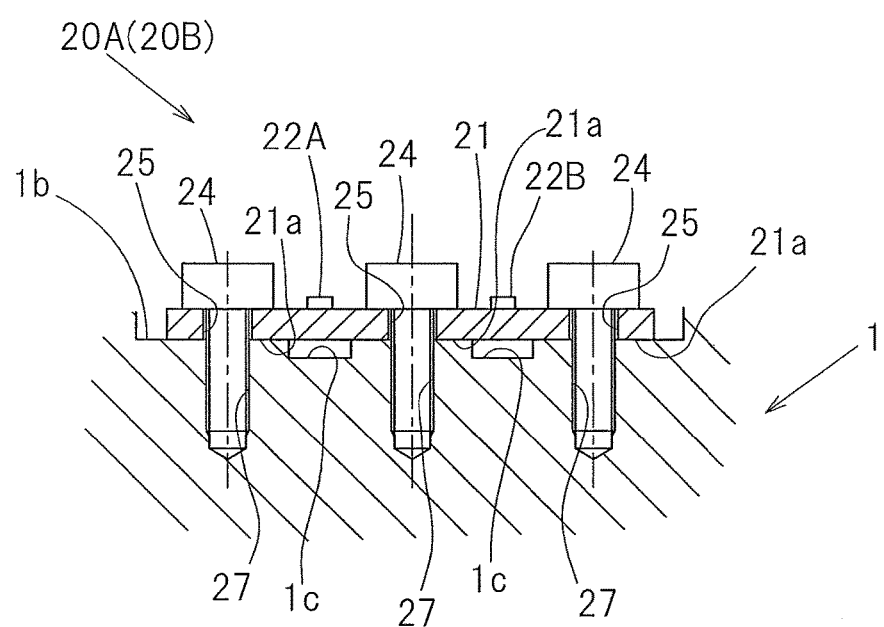
FIG. 5 shows a longitudinal cross sectional view of an alternative arrangement of a sensor unit.

As shown in a longitudinal cross sectional view of FIG. 5, as an alternative to the spacer 23, grooves 1*c* may be formed in an outer diameter surface of the outer member 1, at locations corresponding to the respective centers between the locations in the outer diameter surface of the outer member 1 where the illustrated three fixation contact segments 21*a* are fixed, thus separating the locations of the strain generator member 21 that correspond to the cutout portions 23 a distance from an outer diameter surface of the outer member 1.

Various types of the strain sensors 22A, 22B may be used. For example, the stain sensors 22A, 22B may include a metal foil strain gauge. In this case, the strain sensors 22A, 22B are typically glued and fixed to the strain generator member 21. The strain sensors 22*a*, 22B may include a thick film resistor on the strain generator member 21.

Figure 7:
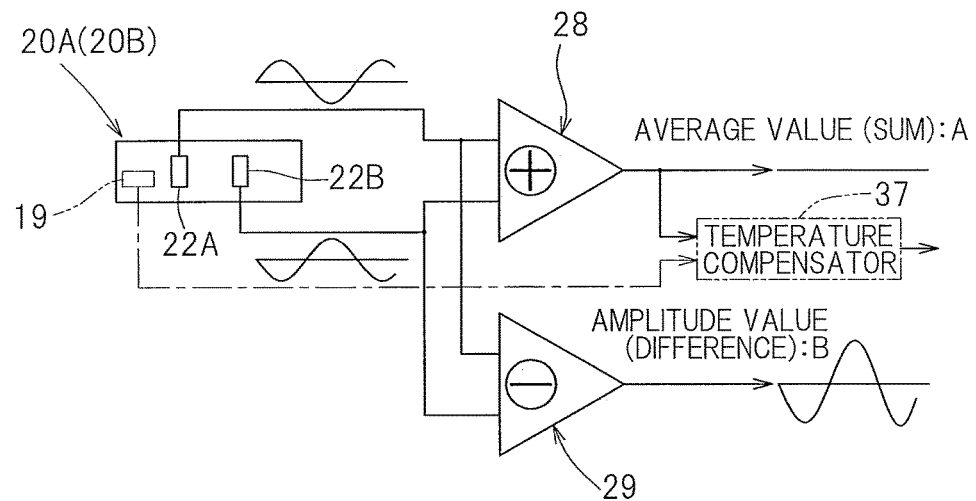
FIG. 7 shows a block diagram of exemplary circuitry for processor that calculates an average value and an amplitude value of sensor output signals.

As shown in FIG. 1, the illustrated two sensors 22A, 22B of a sensor unit 20A (20B) are connected to an average value calculator 28 and an amplitude value calculator 29. As shown in FIG. 7, the average value calculator 28, which includes an adder component, is configured to calculate the sum of output signals of the two illustrated strain sensors 22A, 22B, to output an average value A based on the sum. The amplitude value calculator 29, which includes a subtractor component, is configured to calculate the difference between output signals of the two illustrated strain sensors 22A, 22B, for output of the difference as an amplitude value B. The average value A may be, as an alternative to the sum of sensor output signals, a time-average value of sensor output signals.

The average value calculator 28 and the amplitude value calculator 29 are connected to an estimation unit 30. The estimation unit 30 is configured to estimate through calculation the force, such as a vertical load component $F_z$, that is applied to the bearing assembly or is acting between a wheel and a road surface (i.e. force acting on a tire tread), based on the average value A and/or the amplitude value B calculated using sensor output signals of the sensor unit 20A, 20B. The estimation unit 30 includes a first load estimator 31 and a second load estimator 32. The first load estimator 31 serves as a processor that estimates through calculation a load value LA acting on the bearing assembly, based on an average value A of output signals of the strain sensors 22A, 22B, while the second load estimator 32 serves as a processor that estimates through calculation a load value LB acting on the bearing assembly, based on a combination of the average value A and an amplitude value B of output signals of the strain sensors 22A, 22B. Hence, the first load estimator 31 provides the first load value LA as a calculation result at the output thereof, while the second load estimator 32 provides the second load value LB as a calculation result at the output thereof.

The relationship between a given load L applied to the bearing assembly and the output signals of the strain sensors 22A, 22B, within the linear range and by disregarding an offset, can be expressed by the following equation (1):

$$L = M1 \times S \tag{1}$$

Using the equation (1), an estimate can be made of a given load L that is applied to the bearing assembly or is acting between a wheel and a road surface (i.e. acting on a tire tread). Note that M1 in the equation (1) represents a predefined correction factor.

The first load estimator 31 is configured to estimate through calculation the first load value LA (i.e. calculation result) employing the following linear equation (2):

$$LA = M1 \times A \tag{2}$$

where a variable A represents the aforementioned average value A obtained by canceling offset in output signals of the strain sensors 22A, 22B, and the variable A is multiplied by M1 which represents the predefined correction factor. The use of such a variable in which an offset is canceled enables load estimation with enhanced accuracy.

In the embodiment under discussion where two sensor units 20A, 20B are used, the respective average values from the sensor unit 20A and the sensor unit 20B are applied to calculation that uses the aforementioned equation (2). Hence, the aforementioned equation (2) can be re-expressed as follows:

$$LA = M1A \times AA + M1B \times AB \tag{2'}$$

where AA represents an average value from the sensor unit 20A, AB represents an average value from the sensor unit 20B, in which AA is multiplied by M1A which represents a predefined correction factor and AB is multiplied by M1B which represents a predefined correction factor.

The second load estimator 32 is configured to estimate through calculation the second load value LB (i.e. calculation result) employing the following linear equation (3) that uses as variables the aforementioned average value A and the aforementioned amplitude value B:

$$LB = M2 \times A + M3 \times B \tag{3}$$

in which the variable A is multiplied by M2 which represents a predefined correction factor, and the variable B is multiplied by M3 which represents a predefined correction factor. The use of two different variables enables load estimation with further enhanced accuracy.

In the embodiment under discussion where two sensor units 20A, 20B are used, an average value AA and an amplitude value BA obtained from the sensor unit 20A, and an average value AB and an amplitude value BB obtained from the sensor unit 20B are applied to calculation that uses the aforementioned equation (3). Hence, the aforementioned equation (3) can be re-expressed as follows:

$$LB = M2A \times AA + M2B \times AB + M3A \times BA + M3B \times BB \qquad (3')$$

in which AA is multiplied by M2A which represents a predefined correction factor, AB is multiplied by M2B which represents a predefined correction factor, BA is multiplied by M3A which represents a predefined correction factor, and BB is multiplied by M3B which represents a predefined correction factor. The correction factors in the aforementioned equations are determined in advance through experiments and/or simulations. The calculation in the first load estimator 31 and the calculation in the second estimator 32 are preformed in parallel with each other.

The sensor unit 20A (20B), which is disposed such that it is axially in the vicinity of an outboard-row rolling surface 3 of the outer member 1, produces an output signal a of the strain sensor 22A and an output signal b of the strain sensor 22B, that are subject to the effect of the passing-by of the rolling elements 5 as shown in FIG. 6, when the rolling elements 5 move past the vicinity of the sensor unit 20A (20B). Such an effect of the rolling elements 5 produces the aforementioned offset.

Even when the bearing assembly is out of service, the output signals a, b of the strain sensors 22A, 22B are affected by the position of the rolling elements 5. Each of amplitude of the output signals a, b of the strain sensors 22A, 22B reaches the maximum value when the rolling element 5 take the closest position with respect to the strain sensors 22A, 22B of a sensor unit 20A (20B) or the rolling element 5 move past such a position, and each of the amplitude of the output signals a, b of the strain sensors 22A, 22B decreases as the rolling element 5 move away from such positions or when the rolling element 5 is far from such a position, as shown in FIG. 6.

When the bearing assembly is in rotation, successive passing-by of the rolling elements 5 with a predetermined arrangement pitch P in the vicinity of a sensor units 20A (20B) causes the output signals a, b of the strain sensors 22A, 22B to represent a sinusoidal-like waveform with periods of change as indicated by the solid lines in FIG. 6, with the periods corresponding to the arrangement pitch P of the rolling elements 5. The output signals a, b of the strain sensors 22A, 22B are also affected by temperature and/or by hysteresis that may be caused by slips between a surface of the knuckle 16 and a surface of the vehicle body mounting flange 1a (FIG. 1).

In the embodiment under discussion, the average value A is obtained based on the sum of the output signals a, b of the illustrated two strain sensors 22A, 22B, while the amplitude value B is a time average of absolute difference values |a−b| between the output signals a, b or is an RMS value (i.e. root mean square value) of difference values between the output signals a, b. In this way, the average value A is a value that has cancelled off any variable components that may be caused by the passing-by of the rolling elements 5, and the amplitude value B is a value that has adequately canceled possible effects related to temperature as well as possible effects due to slips—for example, slips between a knuckle surface and a flange surface—on the output signals a, b of the illustrated two strain sensors 22A, 22B. The use of such average value A and amplitude value B enables accurate determination of a given load that is applied to the bearing assembly or is acting on a tire tread.

As shown in FIG. 6, a sensor unit 20A (20B) with an exemplary configuration of FIG. 5 includes three illustrated fixation contact segments 21a arranged circumferentially of an outer diameter surface of the stationary member—that is, the outer member 1—such that two far-end fixation contact segments 21a have a space between them corresponding to arrangement pitch P of the rolling elements 5. In this way, the two illustrated strain sensors 22A, 22B that are arranged at the respective centers between the neighboring fixation contact segments 21a are configured to have a circumferential space between them corresponding to approximately ½ of arrangement pitch P of the rolling elements 5. This results in the output signals a, b of the illustrated two sensors 22A, 22B being approximately 180° out of phase from each other, thus canceling off any variable components in the average value A, which is the sum of the output signals a, b, that may be caused by the passing-by of the rolling elements 5. This also results in the amplitude value B, which is the difference between the output signals a, b, being a value that has adequately canceled possible effects related to temperature as well as possible effects due to slips—for example, slips between a knuckle surface and a flange surface.

In FIG. 6, the illustrated two far-end fixation contact segments 21a are configured to have a space between them corresponding to arrangement pitch P of the rolling elements 5, and the strain sensors 22A, 22B are arranged at the respective centers between the neighboring fixation contact segments 21a. In this way, the illustrated two strain sensors 22A, 22B are configured to have a circumferential spaced between them corresponding to approximately ½ of arrangement pitch P of the rolling elements 5. Alternatively, the circumferential space between the illustrated two strain sensors 22A, 22B may be directly configured to have a circumferential spaced between them corresponding to approximately ½ of arrangement pitch P of the rolling elements 5.

The circumferential space between the illustrated two strain sensors 22A, 22B may be configured to be equal to or approximate to (½+n) times as much as arrangement pitch P of the rolling elements 5, where n is an integer. This also results in the output signals a, b of the illustrated strain sensors 22A, 22B canceling off any variable components in the average value A, which is the sum of the output signals a, b, that may be caused by the passing-by of the rolling elements 5. And this also results in the amplitude value B, which is the difference between the output signals a, b, being a value that has adequately canceled possible effects related to temperature as well as possible effects due to slips—for example, slips between a knuckle surface and a flange surface.

Figure 8:
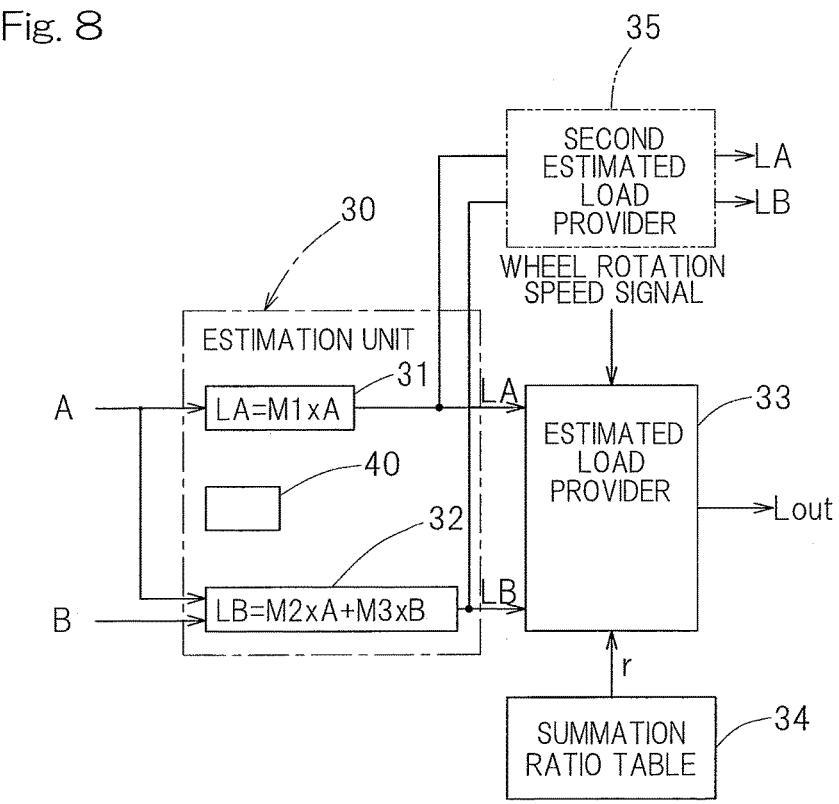
FIG. 8 shows a block diagram of circuitry that estimates a load based on an average value and/or an amplitude value, for output of the resulting estimated load value.

As shown in FIG. 8, the estimation unit 30 is subsequently connected to an estimated load provider 33. The estimated load provider 33 is configured to sum a calculation result LA from the first load estimator 31 and a calculation result LB from the second load estimator 32 in a ratio r (i.e. a value ranging from 0 to 1) that depends on a wheel rotation speed, according to the following equation (4), for output of a resulting estimated load value Lout:

$$Lout = r \times LA + (1-r) \times LB \qquad (4)$$

Figure 9:
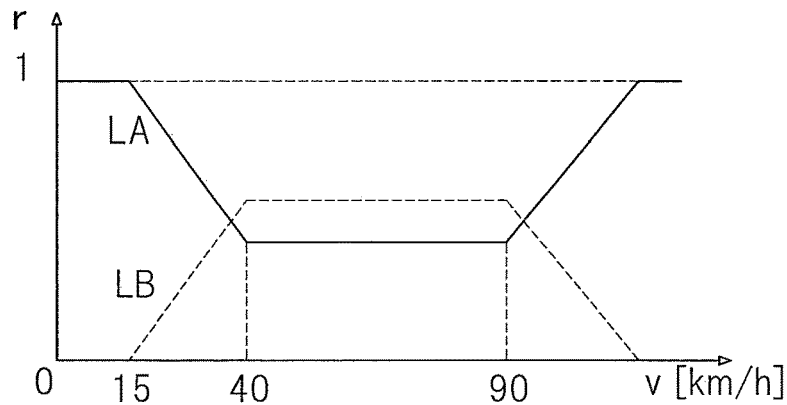
FIG. 9 shows a graph of an exemplary relationship between a wheel rotation speed and a summation ratio.

In the embodiment under discussion, a summation ratio r is read out, based on the wheel rotation speed, from a summation ratio table 34. The relationship between the wheel rotation speed and the summation ratio r, which is mapped in the summation ratio table 34, may be, for example, defined in such a way as shown in FIG. 9. As can be seen from the figure, the summation ratio r is set to 1 when a wheel is not rotating, is set to a value equal to 1 or less in normal speed regime, and is set to increase in high speed regime. Thus, when a wheel is not rotating or the wheel rotation speed is situated in very low speed regime, the first load value LA which is only based on the average value A is outputted. As the wheel rotation speed shifts into normal travel regime where the amplitude value B can be obtained more stably, the sum of the first load value LA and the second load value LB starts to be outputted, with the proportion of the second load value LB being gradually increased. The summation ratio r defined in the summation ratio table 34 is set to be parametrically variable from outside. The term "mapped" used herein refers to a configuration where the summation ratio r is defined correspondingly to various values of a wheel rotation speed. The term "from outside" used in this context refers to "from one or more elements and/or components except the summation ratio table 34 and the estimated load provider 33."

Of the first load value LA and the second load value LB that can be produced in the estimation unit 30, the calculation result LB is generally more accurate because it is estimated through calculation by the second load estimator 32 which uses both the average value A and the amplitude value B. Thus, the summation ratio r is preferably set such that LB is weighted more, when better accuracy is prioritized over shorter time delay. On the other hand, the summation ratio r is preferably set such that LA is weighted more, when it is desired to minimize time delay. Active control of the summation ratio r may be implemented to optimize an estimation load output as desired.

Figure 10:
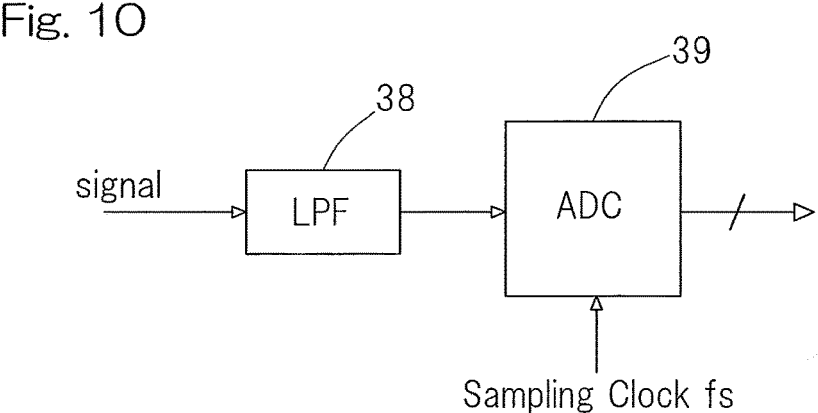
FIG. 10 shows a block diagram of an exemplary configuration of sampling circuitry at a preprocessing stage of sensor output signals.
Figure 11:
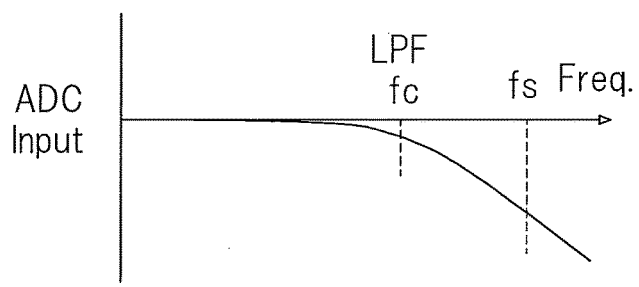
FIG. 11 shows a graph of frequency characteristics of an LPF in the sampling circuitry.

In the embodiment under discussion, the summation ratio r is set such that LA is weighted more when the wheel rotation speed is in high speed regime, for the following reasons. The average value calculator 28 and the amplitude value calculator 29 at the preprocessing stage of sensor output signals may be implemented by a processing circuit which digitalizes sensor output signals through AD conversion to obtain a digitalized value for sampling. In this case, however, an oscillation frequency of the sensor output signals as shown in FIG. 6, which is attributable to revolution of the rolling elements 5 and which changes in proportion to the travel speed of a vehicle, may reach, in high speed regime, a frequency that is in the vicinity of a sampling rate for AD conversion. In this case, aliasing may appear in the sampled data, and the amplitude value B may not be accurately produced by the amplitude value calculator 29. As shown in FIG. 10, an LPF 38 may be provided at the input of an A to D converter 39 in order to minimize aliasing. However, in high speed regime, the presence of the LPF 38 may decrease a measured amplitude value B, thus increasing load estimation errors caused in the second load estimator 32 that uses the measured amplitude value B. FIG. 11 shows frequency characteristics of the LPF 38.

In one example of the summation ratio r as shown in FIG. 9, the summation ratio r for calculation results starts to increases when the travel speed reaches approximately 90 km/h, such that the first load value LA, produced by the first load estimator 31 that uses only the average value A, is weighted more. This can minimize the increase of load estimation errors in high speed regime where errors in a calculated amplitude value start to appear, by reducing the undesirable effects of such errors. Weighting more the first load value LA can also reduce detection time delay, thus allowing for a quicker load detection response during high speed regime. These are advantageous characteristics when implementing various control programs for vehicle stability control, thus further enhancing the safety and stability of a vehicle.

The estimated load provider 33 is configured, for example, to receive information related to the wheel rotation speed from outside, for determination of the summation ratio r based on such information. The term "from outside" used in this context refers to "from one or more elements and/or components except the estimated load provider 33, the processor 28, 29 at a processing stage that precedes the estimated load provider 33, and the estimation unit 30." In this case, the estimated load provider 33 may be configured to receive, as information related to the wheel rotation speed from outside, direct input of an output signal of a wheel rotation speed sensor (not shown) mounted on the bearing assembly. The estimated load provider 33 may be configured to receive information related to the wheel rotation speed from an ECU in the vehicle body. The estimated load provider 33 may be configured to obtain a frequency of the output signals a, b of the strain sensors 22A, 22B, which is attributable to the passing-by of the rolling elements 5, for determination of the wheel rotation speed.

As shown in FIG. 8, in addition to the estimated load provider 33, a second estimated load provider 35 may be provided which is configured to individually output a first estimated load value LA estimated through calculation by the first load estimator 31 and a second estimated load value LB estimated through calculation by the second load estimator 32, thus allowing an ECU that may be provided in the vehicle body to sum these calculation results according to various travel conditions of the vehicle. This enables determination to be made based on more information on travel conditions of the vehicle, thus facilitating the control of the summation ratio r and obtaining an optimal estimated load value.

In the embodiment under discussion, the sensor units 20A, 20B are disposed on vertically upper and lower parts, respectively, of an outer diameter surface of the stationary member—that is, the outer member 1. This enables estimation of a vertical load component $F_z$ with enhanced accuracy. Arrangement of additional sensor units 20 allows for estimation of a load component $F_x$ that may serve as a drive force or a brake force, and/or an axial load component $F_y$, with enhanced accuracy.

As shown in FIG. 7, a sensor unit 20A (20B) may include a temperature sensor 19, and a temperature compensator 37 may be provided which is configured to correct output signals of the sensors, based on detection signals from the temperature sensor 19. Even with the same load, heat generated by rotation of the bearing assembly and/or an ambient environment could change the temperature of the bearing assembly. This may cause, for example, thermal expansion that can result in variations in the output signals of the sensors of the sensor unit 20A (20B). In this way, the detected load may be undesirably affected by temperature. A temperature compensator 37 that corrects the average value A of output signals of the sensors according to the temperature of the bearing assembly and/or an ambient temperature may be provided to minimize possible load estimation errors caused by the temperature.

As shown in FIG. 8, the estimation unit 30 may include an $F_y$ direction determinator 40 configured to determine the direction of an axial load component $F_y$, for use in calculation of an axial load component $F_y$. As mentioned earlier, during rotation of the bearing assembly, sensor units 20A, 20B produce sensor output signals with amplitude having a sinusoidal-like periodic change. The amplitude of the sensor output signals changes according to the magnitude of an axial load component $F_y$ (i.e. moment force).

Figure 12A:
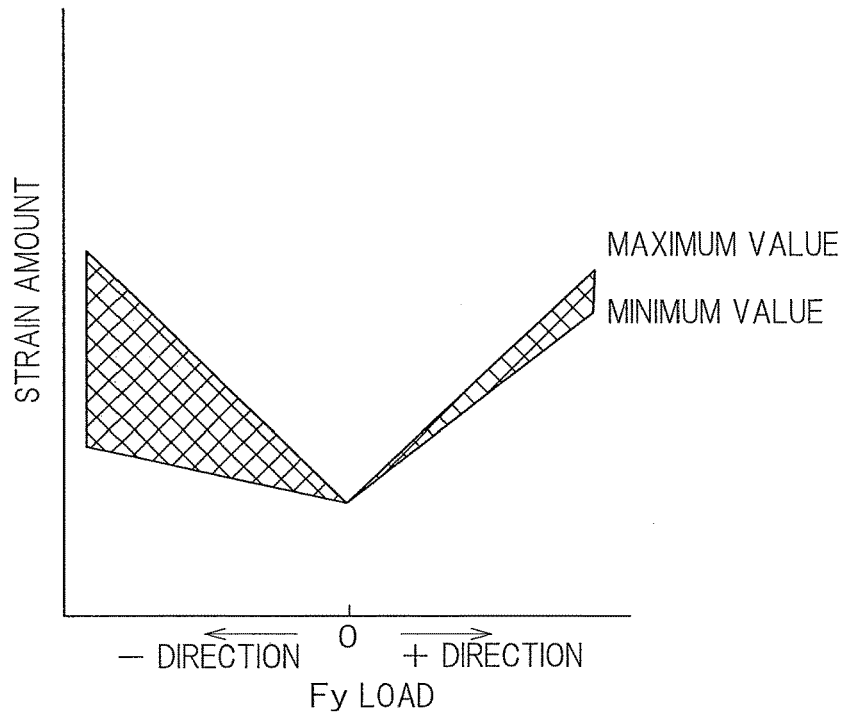
FIG. 12A shows a graph of a relationship between the direction of an axial load component and the amplitude of sensor output signals taken at the upper part of an outer diameter surface of an outer member.
Figure 12B:
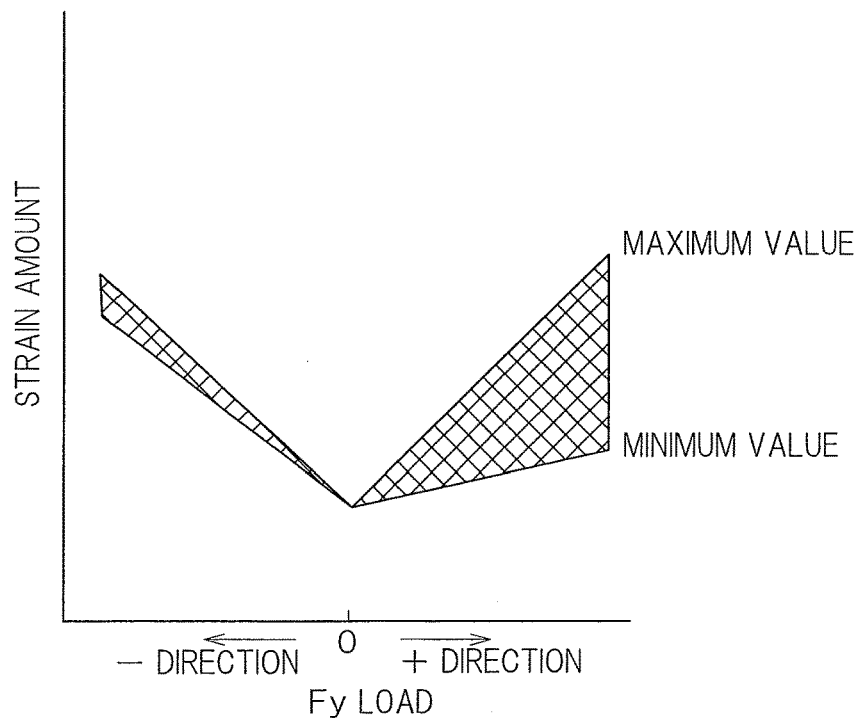
FIG. 12B shows a graph of a relationship between the direction of an axial load component and the amplitude of sensor output signals taken at the lower part of an outer diameter surface of an outer member.
Figure 13:
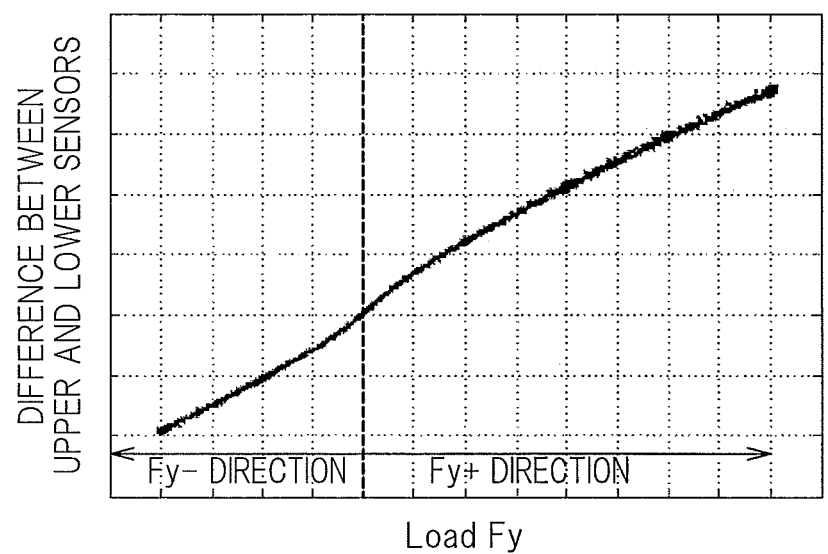
FIG. 13 shows a graph of the magnitude of an axial load component as a function of the difference between the sensor output signals from an upper sensor unit and the sensor output signals from a lower sensor unit.

FIG. 12A shows the sensor outputs from a sensor unit 20A disposed on the upper part of an outer diameter surface of the outer member 1, while FIG. 12B shows the sensor outputs from a sensor unit 20B disposed on the lower part of an outer diameter surface of the outer member 1. In these figures, the horizontal axis represents an axial load component $F_y$, while the vertical axis represents strain in the outer member 1, i.e. sensor output signals. The maximum value and the minimum value in these figures represent respectively the maximum value and the minimum value of the varying signals. As can be seen from these figures, with an axial load component $F_y$ of a positive direction, a smaller load is applied to the rolling elements 5 at the upper part of an outer diameter surface of the outer member 1 (i.e. the difference between the maximum value and the minimum value of the output signals is small), whereas a larger load is applied to the rolling elements 5 at the lower part of an outer diameter surface of the outer member 1 (i.e. the difference between the maximum value and the minimum value of the output signals is large). On the other hand, with an axial load component $F_y$ of a negative direction, a larger load is applied to the rolling elements 5 at the upper part of an outer diameter surface of the outer member 1, whereas a smaller load is applied to the rolling elements 5 at the lower part of an outer diameter surface of the outer member 1. FIG. 13 illustrates a graph showing a relation between the direction of an axial load component $F_y$ and the difference in amplitude between the sensor output signals from an upper sensor unit 20A and the sensor output signals from a lower sensor unit 20B.

The $F_y$ direction determinator 40 is configured to calculate the amplitude as the difference within the sensor output signals from an upper sensor unit 20A as well as the amplitude as the difference within the sensor output signals from a lower sensor unit 20B, that are disposed on the upper and lower parts, respectively, of an outer diameter surface of the outer member 1 and to compare those values to determine the direction of an axial load component $F_y$. Specifically, the $F_y$ direction determinator 40 determines that the direction of an axial load component $F_y$ is positive, when the amplitude as the difference within the sensor output signals from an upper sensor unit 20A is smaller and the amplitude as the difference within the sensor output signals from a lower sensor unit 20B is larger, that are disposed on the upper and lower parts, respectively, of an outer diameter surface of the outer member 1. On the other hand, the $F_y$ direction determinator 40 determines that the direction of an axial load component $F_y$ is negative, when the amplitude as the difference within the sensor output signals from an upper sensor unit 20A is larger and the amplitude as the difference within the sensor output signals from a lower sensor unit 20B is smaller, that are disposed on the upper and lower parts, respectively, of an outer diameter surface of the outer member 1. The estimation unit 30 may be configured to utilize a determination result from the $F_y$ direction determinator 40 in the calculations of an axial load component $F_y$ performed by the first and second load estimators 31, 32. For example, the estimation unit 30 may be configured to reverse the polarities of the parameters in estimation equations, according to a determination result from the $F_y$ direction determinator 40.

A load may act between a tire of a wheel and a road surface. This causes a load to be applied to the outer member 1—which serves as a stationary member of the wheel support bearing assembly in the embodiment under discussion, thus, in turn, causing deformation of the outer member 1. In the embodiment under discussion, at least three fixation contact segments 21a of a strain generator member 21 of a sensor unit 20A (20B), which are fixedly in contact with the outer member 1, facilitates transmission of strain in the outer member 1 to the strain generator member 21 in amplified form. Such strain can be sensed by the strain sensors 22A, 22B with enhanced sensitivity. Also, hysteresis in output signals of the sensors 22A, 22B can be minimized.

Furthermore, the provision of the first load estimator 31 which is configured to estimate through calculation a load acting on the bearing assembly, based on an average value A of output signals of the strain sensors 22A, 22B of a sensor unit 20A (20B), the provision of the second load estimator 32 which is configured to estimate through calculation a load acting on the bearing assembly, based on a combination of the average value A of output signals of the sensors 22A, 22B and an amplitude value B of output signals of the sensors 22A, 22B, and the provision of the estimated load provider 33 which is configured to sum a calculation result from the first load estimator 31 and a calculation result from the second load estimator 32 in a ratio r that depends on a wheel rotation speed, for output of an estimated load value, can provide such advantages as those listed below:

Detection time delay that may be caused by a load estimation calculation operation can be minimized, thereby leading to facilitated control that makes use of the resulting load information.

In a configuration such as disclosed in the Patent Document 3, switching between different load estimation modes with different time delays may, in turn, cause a sudden change in time delay for generating an estimated load. Such a time delay may manifest in the form of detection errors. In contrast, with a sensor-equipped wheel support bearing assembly of the embodiment under discussion, the aforementioned two types of calculation results may be summed in a summation ratio r that shows a continuous change. In this way, the resulting estimated load value does not make a discontinuous change, thereby facilitating the use of the resulting estimated load value for various control operations of a vehicle.

When a wheel is not rotating or a wheel rotation speed is situated in low speed regime, a first load value LA can be produced which is based on the average value A. This enables determination of the characteristics of a load acting between a tire and a road surface even when the vehicle is not moving.

The aforementioned two types of calculation results may be summed in a summation ratio r. Appropriate control of the summation ratio r can optimize an estimated load value as desired.

In high speed regime, sensor output signals may reach a frequency that is in the vicinity of a sampling rate used for AD conversion. Summing the aforementioned two types of calculation results in a summation ratio r enables load detection with enhanced accuracy in spite of possible errors in the amplitude value B that may be caused during high speed regime, by taking a higher proportion of the first load value LA that is calculated based on the average value A, thus minimizing the undesirable effect of the possible errors in the amplitude value B.

As can be seen from the above discussion, non-linear properties of the sensors 22A, 22B can be corrected so as to minimize load estimation errors. Also, an estimated load value can be calculated regardless of various characteristics of an applied load without creating a discontinuous change in the estimated load value. Moreover, an estimated load value can be produced with a minimum detection time delay.

Figure 14:
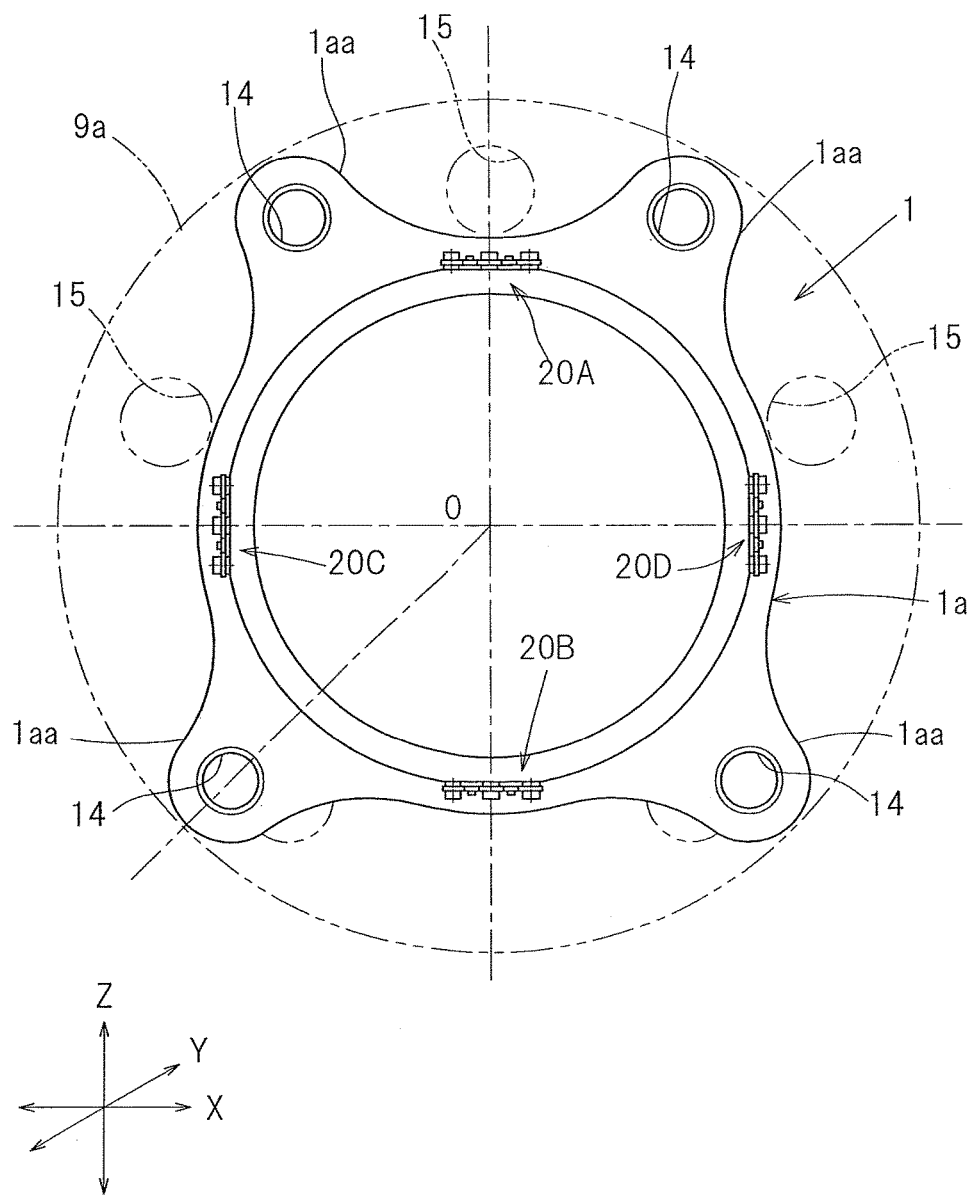
FIG. 14 shows a front elevational view of an outer member of a sensor-equipped wheel support bearing assembly according to the second embodiment of the present invention, as viewed from an outboard side.

FIG. 14 shows a front elevational view of the second embodiment, as viewed from an outboard side, in which four sensor units 20A, 20B, 20C, 20D are evenly disposed on upper, lower, right and left parts, respectively, of an outer diameter surface of the outer member 1—which serves as a stationary member of the wheel support bearing assembly in the embodiment under discussion—such that the four sensor units 20A, 20B, 20C, 20D are positioned to be circumferentially 90° out of phase from each other, with the upper and lower parts corresponding to vertical regions relative to a tire tread and with the right and left parts corresponding to horizontal regions relative to a tire tread. The second embodiment is the same as the previously discussed embodiment except for the arrangement of sensor units 20A, 20B, 20C, 20D. Such arrangement of the four sensor units 20A, 20B, 20C, 20D enables more accurate estimation of a vertical load component $F_z$ acting on the bearing assembly, a load component $F_x$ that may serve as a drive force or a brake force, and/or an axial load component $F_y$.

The third embodiment of the present invention will now be described with reference to FIGS. 15 to 19. It is to be noted that those features corresponding to the features already described with reference to the preceding embodiments will be given the same reference signs and will not be described. In the discussion of a given configuration where only certain features are described, the remaining non-described features should be considered as the same as those already described with reference to the preceding embodiment(s). The same features provide the same advantages or produce the same effects throughout different embodiments. Also note that beside the combinations of the features described in detail with reference to a certain embodiment, various embodiments themselves can be partially combined with each other unless such combinations are inoperable.

Figure 15:
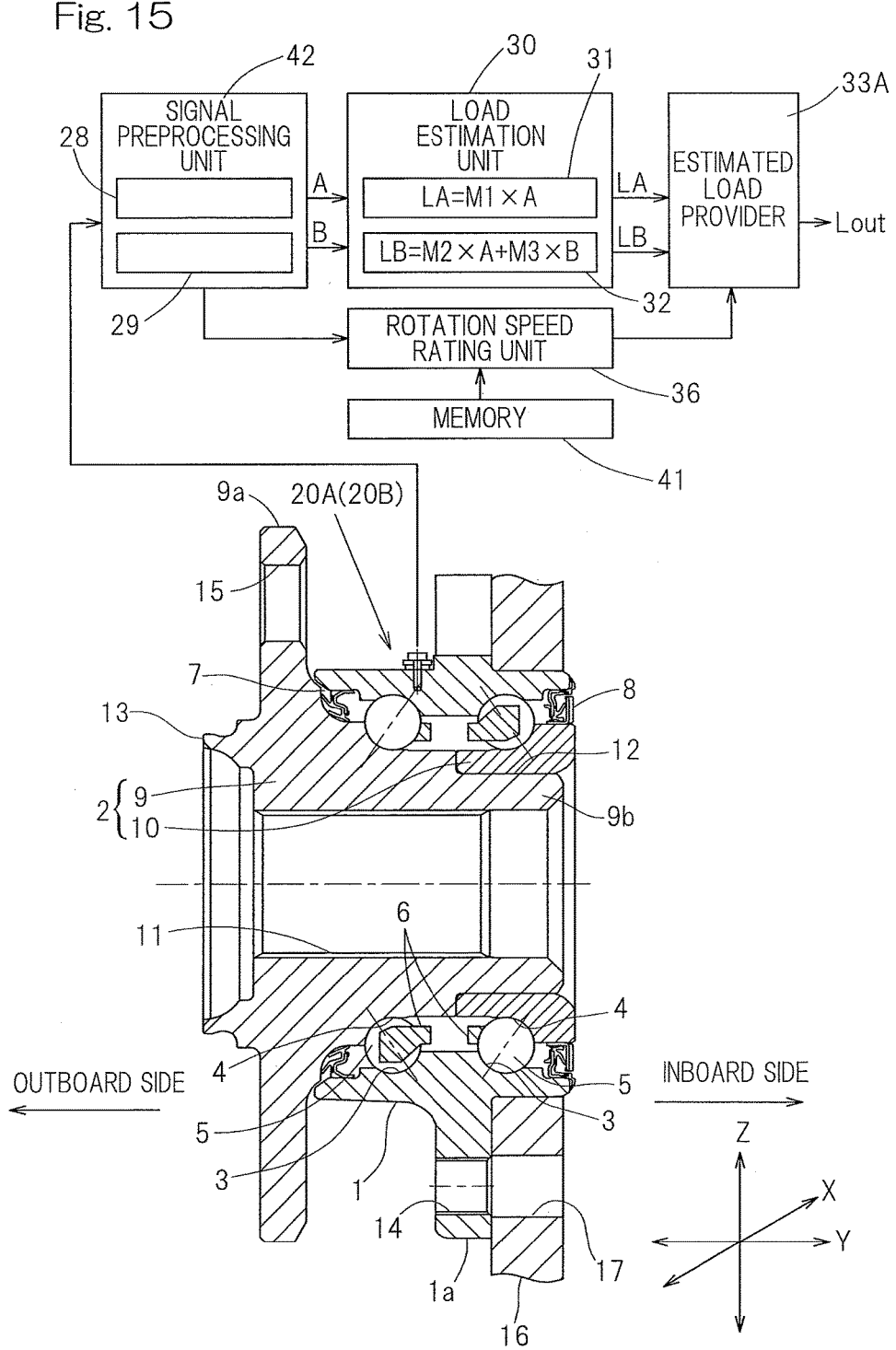
FIG. 15 shows a longitudinal cross sectional view of a sensor-equipped wheel support bearing assembly according to the third embodiment of the present invention, together with a block diagram of a schematic configuration of a detection system.
Figure 16:
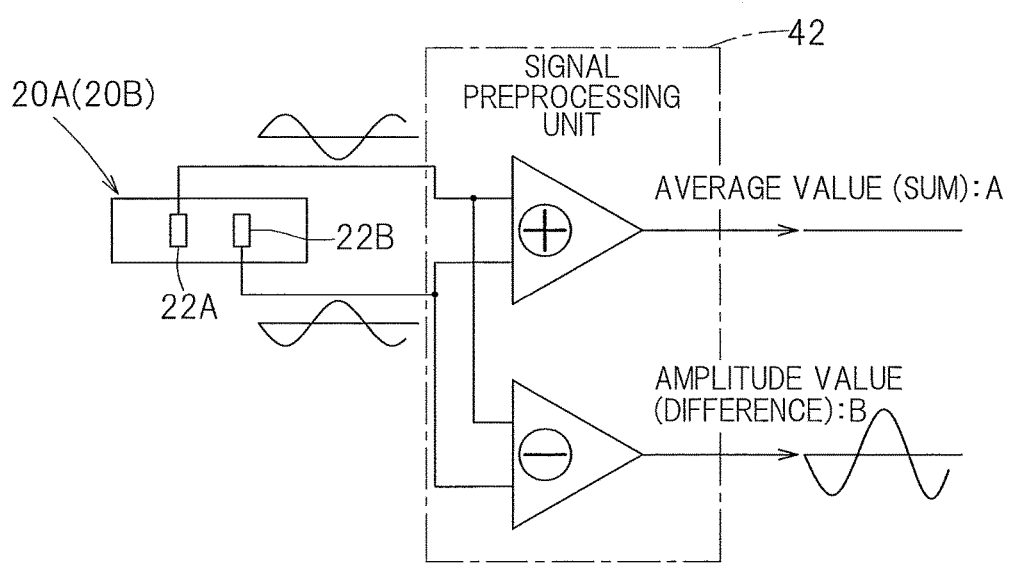
FIG. 16 shows a block diagram of exemplary circuitry for processor that calculates an average value and an amplitude value of sensor output signals.

The third embodiment provides a sensor-equipped wheel support bearing assembly that can perform load estimation calculation to produce an estimated value with accuracy, without using signals from a rotation sensor and/or using information related to a vehicle wheel rotation speed that may be supplied from a vehicle body. As shown in FIG. 15, in the third embodiment, the average value calculator 28 and the amplitude value calculator 29 form a signal preprocessing unit 42 which is connected to the estimation unit 30.

As shown in FIG. 15, the signal preprocessing unit 42 is also connected to a rotation speed rating unit 36. The rotation speed rating unit 36 is configured to determine a rating value V that serves as an evaluation index for the wheel rotation speed, based on the average value A and the amplitude value B produced in the signal preprocessing unit 42 using output signals a, b of the strain sensors 22A, 22B.

Figure 17:
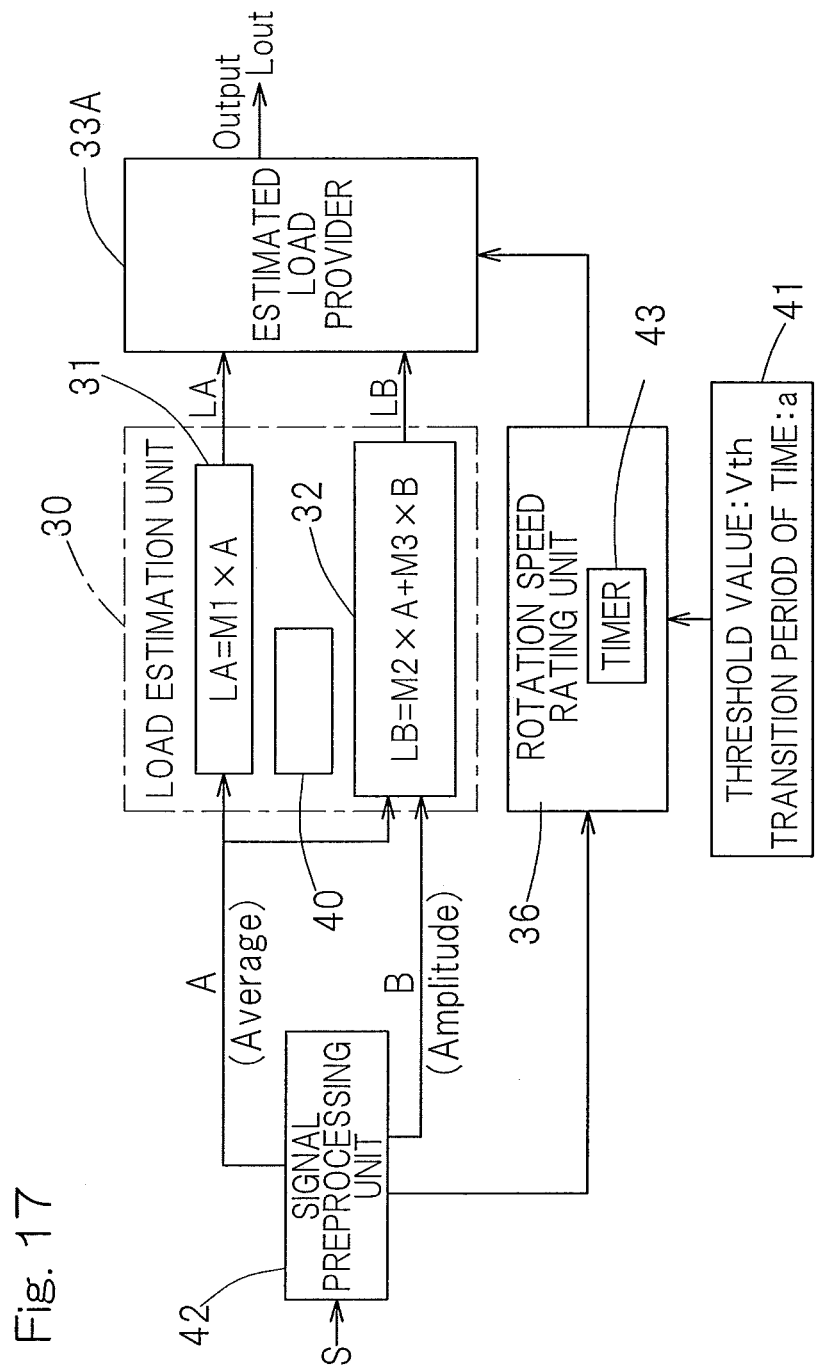
FIG. 17 shows a block diagram of the overall configuration of the detection system.

As shown in FIG. 17, the estimation unit 30 is subsequently connected to an estimated load provider 33A. The estimated load provider 33A is configured to sum calculation results (i.e. load values) from the two load estimators 31, 32 in the estimation unit 30, for output of the resulting estimated load value Lout. The two types of calculation results LA, LB are summed in a ratio r(t) that varies depending on time t elapsed since a traverse of a rating value V determined in the rotation speed rating unit 36 across a predefined threshold value Vth. The predefined threshold value Vth is read out from a memory 41.

The operation of a detection system in the wheel support bearing assembly under discussion will now be described. In the signal preprocessing unit 42, an average value A and an amplitude value B are produced based on the output signals S of the strain sensors 22A, 22B. Subsequently, in the rotation speed rating unit 36, a rating value V for evaluation of the rotation speed is determined based on the average value A and/or the amplitude value B. Then, in the rotation speed rating unit 36, the determined rating value V is compared with the predefined threshold value Vth to determine whether the current conditions fall within a rotation speed regime RA where the first calculation result LA produced in the estimation unit 30 is used or fall within a rotation speed regime RB where the second calculation result LB is used.

In the embodiment under discussion, the rating value V for evaluation of the rotation speed is, for example, sum of the selected amplitude value B of output signals of the sensors 22A, 22B that are inputted within a certain period of time. In this case, either the sum of the amplitude value B of all of the output signals may be used or the sum of the amplitude value B of a selected part of the output signals may be used. Alternatively, the rotation speed may be estimated based on a fundamental frequency component that is extracted from output signals of the strain sensors 22A, 22B. The rating value V does not necessarily have to be in strict proportion with the rotation speed, as long as the rating value V enables, in low speed regime where evaluation of the rotation speed is desired, determination of whether the rotation speed exceeds a certain value or not. In this way, the rating value V does not necessarily have to be of high quality. This eliminates the need to provide for a rotation sensor that produces an accurate rotation speed and/or to provide for an interface to receive information from an external sensor, thus resulting in a simplified construction or configuration.

Figure 18:
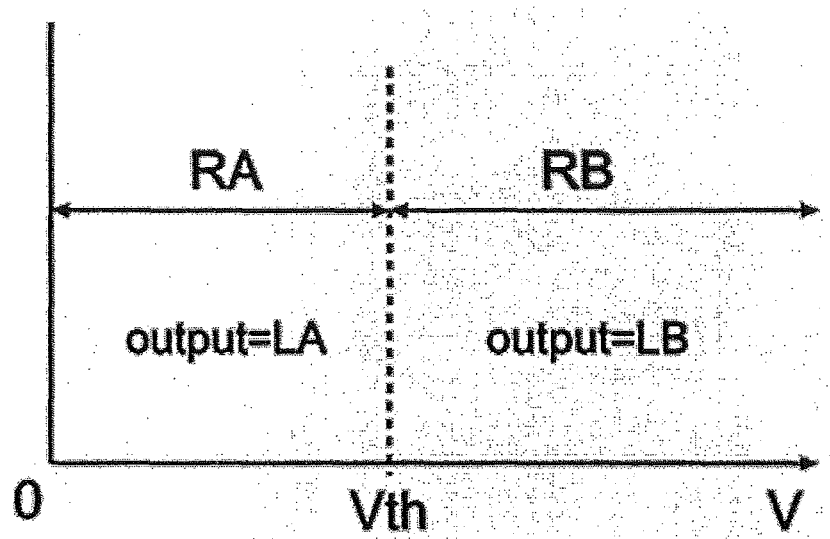
FIG. 18 shows a relationship between a rating value V and rotation speed regimes RA, RB.

In the estimation unit 30, the first calculation result LA and the second calculation result LB are produced in parallel with each other by the first processor 31 and the second processor 32, respectively. The first calculation result LA is calculated only based on the average value A of output signals of the strain sensors 22A, 22B (i.e. based on the Sum of output signals of the illustrated two strain sensors 22A, 22B that are spaced apart a distance that corresponds to ½ of arrangement pitch P of the rolling elements 5). The second calculation result LB is calculated based on the average value A (which may be the aforementioned Sum or a time average value Av) and the amplitude value B. According to the rating value V for evaluation of the rotation speed, either one of the first and second calculation results is selected and outputted as an estimated load value Lout. During travel, the rating value V may change and exceed the boundary between the rotation speed regime RA and the rotation speed regime RB. In that case, the two types of calculation results are summed in a weighting ratio that depends on the time elapsed since an exceeding of the rating value V over the boundary. Specifically, the calculation result LA and the calculation result LB are summed in a ratio r(t), for output of the resulting estimated load value Lout. It is to be noted that RA represents low rotation speed regime and RB represents normal rotation speed regime. FIG. 18 shows a relationship between a rating value V and rotation speed regimes RA, RB.

Figure 19:
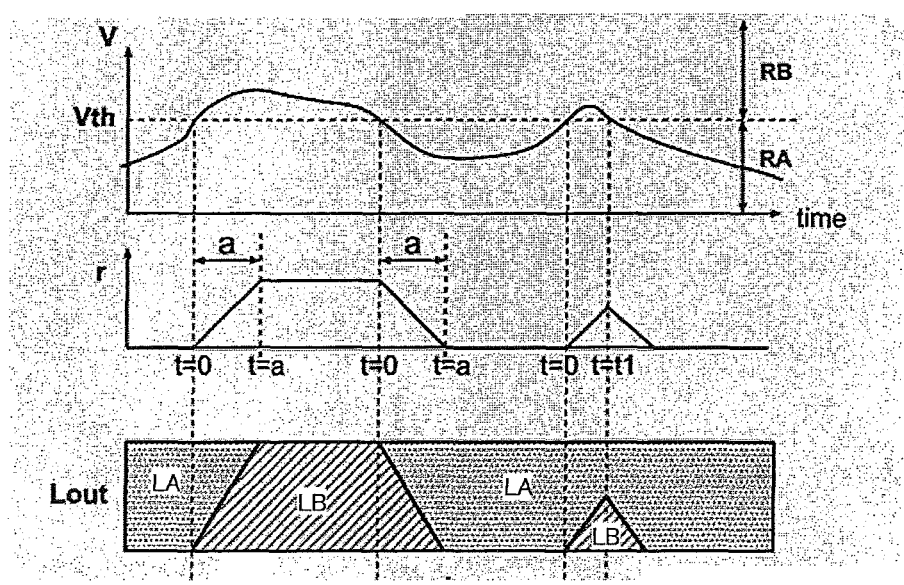
FIG. 19 shows an example of how an estimated load value Lout may be calculated in an estimated load provider.
Figure 20:
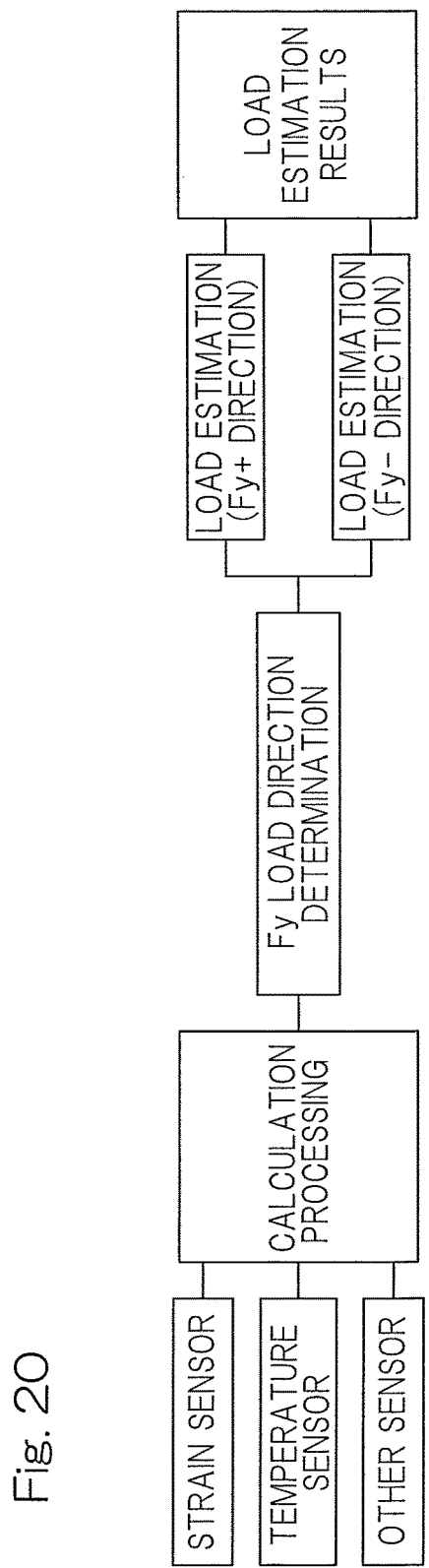
FIG. 20 shows the flow of a load estimation operation that may be performed in a device according to related art.
Figure 21:
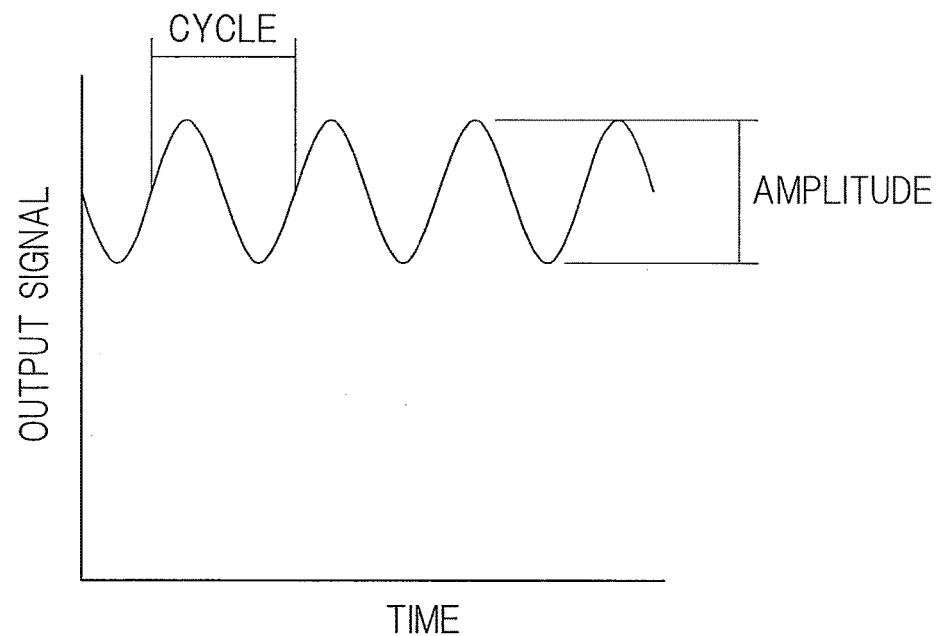
FIG. 21 shows the waveform of sensor output signals that may be employed in the device according to related art.
Figure 22:
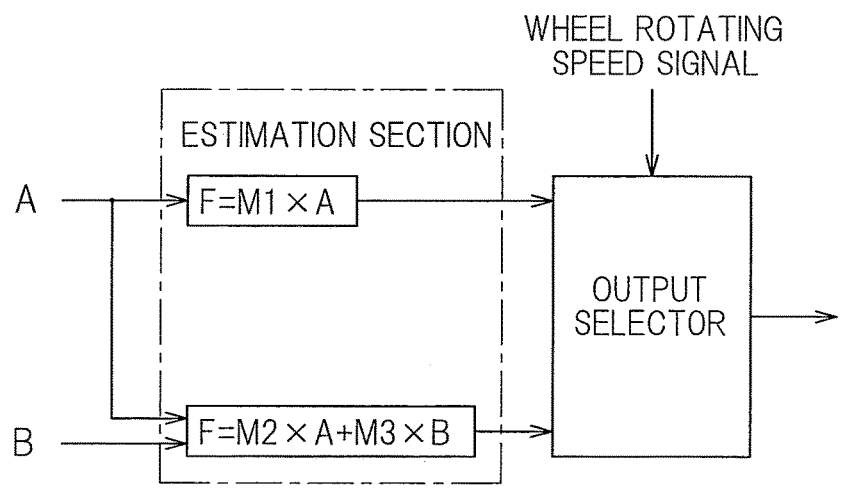
FIG. 22 shows a block diagram of a schematic configuration of a load estimation unit in another device according to related art.

FIG. 19 shows an example of how an estimated load value Lout may be calculated in the estimated load provider 33A. For example, if the rotation speed shifts from the regime RA to the regime RB, the summation in the estimated load provider 33A is performed according to the following equation:

$$Lout=(1-r(t))\times LA+r(t)\times LB \qquad (4)$$

where t represents the time elapsed since an exceeding of the rotation speed over the boundary and the ratio r(t) ranges from 0 to 1.

The ratio r(t) may be, for example, defined by the following linear function:

$$r(t)=t/a(0<t<a) \qquad (5)$$

The ratio r(t) may be defined by the following trigonometric function:

$$r(t)=\sin(\pi t/2a)^2(0<t<a) \qquad (6)$$

Use of a quadratic or higher order function results in the formation of smoother shifts. In any case, a function is used which changes from zero to 1 in the range of t=0 to t=a. With such calculation, until the time t elapsed since an exceeding of the rotation speed over the boundary reaches t=a, the first calculation result LA and the second calculation result LB are selectively summed and outputted as the resulting estimated load value Lout. After the time t elapsed since an exceeding of the rotation speed over the boundary has reached t=a, a calculation result in the rotation speed regime RB starts to be outputted. The predetermined period of time a (which is hereinafter referred to as "transition period of time") which is to be used with respect to the time elapsed since an exceeding of the rotation speed over the boundary, together with the threshold value Vth, is written in advance in the memory 41 as shown in FIG. 17. The time elapsed since an exceeding of the rotation speed over the boundary is measured by a timer 43 in the rotation speed rating unit 36.

On the other hand, if the rotation speed shifts from the regime RB to the regime RA, the summation in the estimated load provider 33A is performed according to the following equation:

$$Lout=(1-r(a-t))\times LA+r(a-t)\times LB \qquad (7)$$

in which t represents the time elapsed since an exceeding of the rotation speed over the boundary.

If the rotation speed, which has shifted from the regime RA to the regime RB, shifts back from the regime RB to the regime RA before the time t reaches the transition period of time a (i.e. at t=t1), the summation ratio r(t) where t=a−t1 becomes a starting value for subsequent calculation.

The processing time T in the signal preprocessing unit 42 to calculate the average value A and the amplitude value B to be used in the calculations in the estimation unit 30 may be configured to change according to the rating value V. The processing time T may be configured to be longer when the wheel rotation speed is situated in low speed regime and to be shorter when the rotation speed is higher. This can minimize the reduction in accuracy of calculation by the estimation unit 30 that involves the use of the amplitude value B during high speed regime, while expediting the response of calculation results during higher speed regime where a quicker response is desired. Even if the correlation between the rating value V and the rotation speed is low, a map of the values of the wheel rotation speed with respect to corresponding values of the processing time T may be provided to allow optimal selection of the processing time T according to a given speed regime.

The provision of an estimation unit 30 that includes the first load estimator 31 configured to estimate through calculation a load acting on the bearing assembly, based on an average value A of output signals of the strain sensors 22A, 22B of a sensor unit 20A (20B) and that also includes the second load estimator 32 configured to estimate through calculation a load acting on the bearing assembly, based on a combination of the average value A and an amplitude value B of output signals of the strain sensors 22A, 22B, the provision of the rotation speed rating unit 36 configured to determine a rating value V that represents the wheel rotation speed, based on output signals of the strain sensors 22A, 22B, and the provision of the estimated load provider 33A configured to sum based on the rating value V the calculation results of the two estimators 31, 32 in the estimation unit 30, for output of an estimated load value, wherein the estimated load provider 33A is configured to sum the calculation results in a ratio r that depends on time elapsed since a traverse of the rating value V across a predefined threshold value Vth, can provide such advantages as those listed below:

Load estimation calculation can be performed without using signals from a rotation sensor and/or using information related to a vehicle wheel rotating speed that may be supplied from a vehicle body, thereby eliminating the need to provide additional wires. This can minimize manufacturing cost of a load sensor assembly and can also provide enhanced freedom in mounting a load sensor assembly in a vehicle.

Switching between a load estimation calculation in normal speed rotation regime and a load estimation calculation in low speed rotation regime can minimize load estimation errors, thus providing an estimated load value with enhanced accuracy.

A summation ratio configured to change with no discontinuous shift can prevent discontinuous change in load signals from occurring when switching load estimation calculations in dependence on rotation speed, thus facilitating the use of load signals for various control operations of a vehicle.

A sudden braking operation during travel may cause a sudden change in a rotation speed, which may, in turn, cause a slip. The aforementioned configuration, however, produces an estimated load value even when a wheel is not rotating or the rotation speed is situated in very low speed regime. Thus, regardless of travel conditions of the vehicle, signals can be used in, for example, various control operations of a vehicle.

Although in the discussion of the preceding embodiments, the outer member 1 serves as a stationary member, these embodiments can be applied to a wheel support bearing assembly in which an inner member serves as a stationary member. In such a case, the sensor unit(s) 20 may be associated with an inner peripheral surface of the inner member. Although in the foregoing discussion, the preceding embodiments have been applied to a wheel support bearing assembly of a third generation type, the present invention can be applied to a wheel support bearing assembly of a first or second generation type, where a bearing structure and a hub unit are independent components, and also can be applied to a wheel support bearing assembly of a fourth generation type, where an outer ring of a constant velocity joint forms part of an inner member. A sensor-equipped wheel support bearing assembly according to the present invention can be applied to a wheel support bearing assembly for supporting a driven wheel and can also be applied to a wheel support tapered roller bearing assembly of any generation type.

Although the present invention has been described in connection with embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Outer member
2: Inner member
3, 4: Rolling surface
5: Rolling element
19: Temperature sensor
20A to 20D: Sensor unit
21: Strain generator member
21a: Fixation contact segment
22A, 22B: Strain sensor
28: Average value calculator
29: Amplitude value calculator
30: Estimation unit
31: First load estimator
32: Second load estimator
33, 33A: Estimated load provider
34: Summation ratio table
35: Second estimated load provider
37: Temperature compensator
42: Signal preprocessing unit

What is claimed is:

1. A sensor-equipped wheel support bearing assembly for rotatably supporting a wheel relative to a vehicle body comprising:
   an outer member having an inner periphery formed with a plurality of rolling surfaces;
   an inner member having an outer periphery formed with a plurality of rows of raceway surfaces opposed to the rolling surfaces of the outer member, one of the outer member and the inner member serving as a stationary member;
   a plurality of rows of rolling elements interposed between the plurality of rolling surfaces of the outer member and the plurality of rolling surfaces of the inner member;
   a wheel rotation speed determination means to determine a wheel rotation speed of the wheel;
   a load-detectable sensor unit including a strain generator member and at least two sensors mounted on the strain generator member to sense strain in the strain generator member, the strain generator member including at least three fixation contact segments fixedly in contact with the stationary member;
   a first load estimator configured to estimate through calculation a load acting on the bearing assembly, based on an average value of output signals of the at least two sensors;
   a second load estimator configured to estimate through calculation a load acting on the bearing assembly, based on a combination of the average value and an amplitude value of the output signals of the at least two sensors; and
   an estimated load provider configured to sum a calculation result from the first load estimator and a calculation result from the second load estimator in a ratio r that depends on the wheel rotation speed determined by the wheel rotation speed determination means, and to output an estimated load value,
   wherein the at least three fixation contact segments include a first fixation contact segment, a second fixation contact segment, and a third fixation contact segment,
   the at least two sensors include a first sensor and a second sensor, the first sensor is arranged between the first fixation contact segment and the second fixation contact segment, the second sensor is arranged between the second fixation contact segment and the third fixation contact segment, with a space between the first sensor and the second sensor, and
   the first load estimator and the second load estimator are configured to use as the average value a sum of the output signals of the two sensors.

2. The sensor-equipped wheel support bearing assembly as claimed in claim 1, wherein the ratio r used in the estimated load provider is set to 1 when a wheel is not rotating or when the wheel rotation speed is below a predetermined low speed.

3. The sensor-equipped wheel support bearing assembly as claimed in claim 1, wherein the ratio r used in the estimated load provider is set so as to increase as the wheel rotation speed shifts from a predetermined normal speed range to a predetermined high speed range.

4. The sensor-equipped wheel support bearing assembly as claimed in claim 1, wherein the ratio r used in the estimated load provider is relative to values of the wheel rotation speed and is set to be parametrically variable from outside.

5. The sensor-equipped wheel support bearing assembly as claimed in claim 1, wherein the wheel rotation speed determination means is a wheel rotation speed sensor mounted on the bearing assembly to determine the wheel rotation speed, and
the estimated load provider is configured to receive direct input of an output signal of the wheel rotation speed sensor.

6. The sensor-equipped wheel support bearing assembly as claimed in claim 1, wherein the wheel rotation speed determination means is formed in an electronic control unit in the vehicle body, and
the estimated load provider is configured to receive information related to the wheel rotation speed from the electronic control unit in the vehicle body.

7. The sensor-equipped wheel support bearing assembly as claimed in claim 1, wherein the wheel rotation speed determination means is formed in the estimated load provider, the estimated load provider being configured to determine the wheel rotation speed based on frequency of an amplitude component contained in the output signals of the at least two sensors, which is attributable to revolution of the rolling elements.

8. The sensor-equipped wheel support bearing assembly as claimed in claim 1, wherein the sensor unit includes at least three sensor units, and the first load estimator and the second load estimator are configured to estimate through calculation radial load components Fx, Fz radially acting on the bearing assembly as well as an axial load component Fy axially acting on the bearing assembly, based on output signals of sensors of the at least three sensor units.

9. The sensor-equipped wheel support bearing assembly as claimed in claim 1, wherein the sensor unit includes four sensor units, and the four sensor units are evenly disposed on upper, lower, right and left parts, respectively, of an outer diameter surface of the stationary member such that the four sensor units are positioned to be circumferentially 90° out of phase from each other, the upper and lower parts corresponding to vertical regions relative to a tire tread and the right and left parts corresponding to horizontal regions relative to a tire tread.

10. The sensor-equipped wheel support bearing assembly as claimed in claim 1, wherein the sensor unit includes a temperature sensor, and
the bearing assembly further comprising a temperature compensator configured to correct the output signals of the at least two sensors, based on detection signals from the temperature sensor.

11. The sensor-equipped wheel support bearing assembly as claimed in claim 1, further comprising, in addition to the estimated load provider a second estimated load provider configured to individually output an estimated load value estimated through calculation by the first load estimator and an estimated load value estimated through calculation by the second load estimator.

12. The sensor-equipped wheel support bearing assembly as claimed in claim 1, further comprising a rotation speed rating unit configured to determine a rating value V that represents the wheel rotation speed, based on the output signals of the at least two sensors,
wherein the estimated load provider is configured to sum the calculation results with the summation ratio r that changes depending on time elapsed since a traverse of the rating value V across a predefined threshold value Vth.

13. The sensor-equipped wheel support bearing assembly as claimed in claim 12, wherein the average value and/or the amplitude value of the output signals of the at least two sensors used in calculation by the load estimators are determined, based on the output signals of the at least two sensors that are obtained within a defined period of time T.

14. The sensor-equipped wheel support bearing assembly as claimed in claim 13, wherein the certain period of time T changes according to the rating value V determined by the rotation speed rating unit.

15. A sensor-equipped wheel support bearing assembly for rotatably supporting a wheel relative to a vehicle body comprising:
an outer member having an inner periphery formed with a plurality of rolling surfaces;
an inner member having an outer periphery formed with a plurality of rows of raceway surfaces opposed to the rolling surfaces of the outer member, one of the outer member and the inner member serving as a stationary member;
a plurality of rows of rolling elements interposed between the plurality of rolling surfaces of the outer member and the plurality of rolling surfaces of the inner member;
a wheel rotation speed determination means to determine a wheel rotation speed of the wheel;
a load-detectable sensor unit including a strain generator member and at least two sensors mounted on the strain generator member to sense strain in the strain generator member, the strain generator member including at least three fixation contact segments fixedly in contact with the stationary member;
a first load estimator configured to estimate through calculation a load acting on the bearing assembly, based on an average value of output signals of the at least two sensors;
a second load estimator configured to estimate through calculation a load acting on the bearing assembly, based on a combination of the average value and an amplitude value of the output signals of the at least two sensors; and an estimated load provider configured to sum a calculation result from the first load estimator and a calculation result from the second load estimator in a ratio r that depends on the wheel rotation speed determined by the wheel rotation speed determination means, and to output an estimated load value,
wherein the fixation contact segments in the sensor unit include a first fixation contact segment, a second fixation contact segment, and a third fixation contact segment, the first fixation contact segment and the second fixation contact segment being next to each other with a space therebetween, the second fixation contact segment and the third fixation contact segment being next to each other with a space therebetween;
the sensors include two sensors, with one arranged between the first fixation contact segment and the second fixation contact segment and with the other arranged between the second fixation contact segment and the third fixation contact segment, with a space between the two sensors;
the space between the fixation contact segments or the space between the two sensors has a circumferential dimension that is (½+n) times as much as an arrangement pitch of the rolling elements, with n being an integer; and
the first load estimator and the second load estimator are configured to use as the average value a sum of the output signals of the two sensors.

16. The sensor-equipped wheel support bearing assembly as claimed in claim 12, wherein the ratio r used in the estimated load provider is determined by a linear function that uses as a variable the time elapsed since a traverse of the rating value V across the predefined threshold value Vth.

17. The sensor-equipped wheel support bearing assembly as claimed in claim 12, wherein the ratio r used in the estimated load provider is determined by a quadratic or higher order function that uses as a variable the time elapsed since a traverse of the rating value V across the predefined threshold value Vth.

18. The sensor-equipped wheel support bearing assembly as claimed in claim 12, wherein change in the ratio r used in the estimated load provider stops when the time elapsed since a traverse of the rating value V across the predefined threshold value Vth reaches a predefined transition period of time a.

19. The sensor-equipped wheel support bearing assembly as claimed in claim 18, wherein, when time elapsed since the rating value V once traversed the predefined threshold value Vth until subsequently traverses the predefined threshold value Vth is shorter than the transition period of time a, the ratio r at the time of the re-traverse of the rating value V across the predefined threshold value Vth becomes a starting value from which a subsequent change in the ratio r occurs.

20. The sensor-equipped wheel support bearing assembly as claimed in claim 12, wherein the rotation speed rating unit is configured to generate the rating value V as sum of selected amplitude values of the output signals of the at least two sensors.

21. The sensor-equipped wheel support bearing assembly as claimed in claim 12, wherein the rotation speed rating unit is configured to determine the rating value V, based on frequency of an amplitude component contained in the output signals of the at least two sensors, which is attributable to revolution of the rolling elements.

* * * * *